(12) United States Patent
Saito et al.

(10) Patent No.: US 10,052,719 B2
(45) Date of Patent: Aug. 21, 2018

(54) LASER WELDING DEVICE, LASER WELDING METHOD, AND BATTERY CASING

(71) Applicant: PRIMEARTH EV ENERGY CO., LTD., Kosai-shi, Shizuoka (JP)

(72) Inventors: Shigeki Saito, Hamamatsu (JP); Nobuaki Sakayanagi, Toyohashi (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 257 days.

(21) Appl. No.: 14/771,464

(22) PCT Filed: Mar. 11, 2015

(86) PCT No.: PCT/JP2015/057188
§ 371 (c)(1),
(2) Date: Aug. 28, 2015

(87) PCT Pub. No.: WO2015/146591
PCT Pub. Date: Oct. 1, 2015

(65) Prior Publication Data
US 2016/0361782 A1    Dec. 15, 2016

(30) Foreign Application Priority Data

Mar. 27, 2014  (JP) ................................ 2014-066853
Mar. 27, 2014  (JP) ................................ 2014-066854

(51) Int. Cl.
*B23K 26/06*   (2014.01)
*B23K 26/02*   (2014.01)
(Continued)

(52) U.S. Cl.
CPC .......... *B23K 26/206* (2013.01); *B23K 26/032* (2013.01); *B23K 26/067* (2013.01);
(Continued)

(58) Field of Classification Search
CPC .... B23K 26/00; B23K 26/0066; B23K 26/02; B23K 26/035; B23K 26/04–26/0652; B23K 26/206–26/302
(Continued)

(56) References Cited

U.S. PATENT DOCUMENTS 4,857,697 A * 8/1989 Melville ............ B23K 26/0613
                                              219/121.63
5,029,243 A * 7/1991 Dammann .......... B23K 1/0056
                                              219/121.63
(Continued)

FOREIGN PATENT DOCUMENTS

JP      H05-104276 A    4/1993
JP      H08-108289 A    4/1996
(Continued)

OTHER PUBLICATIONS

JP Office Action dated Feb. 6, 2017 as received in Application No. 2014-066853 (Machine Translation).
(Continued)

*Primary Examiner* — Michael Laflame, Jr.
(74) *Attorney, Agent, or Firm* — Maschoff Brennan

(57) ABSTRACT

A laser welding device that laser-welds a lid to an open portion of a casing emits a laser beam to a joining subject portion including an inner side surface of the casing that defines the open portion and a peripheral surface of the lid that faces the inner side surface of the casing. The inner side surface of the casing and the peripheral surface of the lid are arranged to form a groove in between, and include inclined surfaces that function as a sliding portion. The groove portion has a groove width that is variable by sliding the sliding portion. A detection unit detects the groove width of the groove portion. An adjustment force application unit applies force for adjusting the groove width to the casing. A control unit controls the force applied by the adjustment
(Continued)

force application unit in accordance with the groove width detected by the detection unit.

15 Claims, 12 Drawing Sheets

(51) Int. Cl.
| | |
|---|---|
| *B23K 26/00* | (2014.01) |
| *B23K 26/20* | (2014.01) |
| *B23K 26/03* | (2006.01) |
| *B23K 26/28* | (2014.01) |
| *B23K 26/70* | (2014.01) |
| *B23K 26/0622* | (2014.01) |
| *B23K 26/067* | (2006.01) |
| *B23K 26/26* | (2014.01) |
| *H01M 2/02* | (2006.01) |
| *H01M 2/04* | (2006.01) |
| *B23K 101/36* | (2006.01) |

(52) U.S. Cl.
CPC ...... *B23K 26/0622* (2015.10); *B23K 26/0626* (2013.01); *B23K 26/26* (2013.01); *B23K 26/28* (2013.01); *B23K 26/702* (2015.10); *H01M 2/0202* (2013.01); *H01M 2/0237* (2013.01); *H01M 2/0285* (2013.01); *H01M 2/0426* (2013.01); *H01M 2/0439* (2013.01); *H01M 2/0486* (2013.01); *B23K 2201/36* (2013.01)

(58) Field of Classification Search
USPC .......................................... 219/121.6–121.64
See application file for complete search history.

(56) References Cited

U.S. PATENT DOCUMENTS

| | | | | |
|---|---|---|---|---|
| 5,463,202 | A | * 10/1995 | Kurosawa | ............ B23K 26/032 219/121.62 |
| 5,690,845 | A | 11/1997 | Fuse | |
| 5,698,120 | A | * 12/1997 | Kurosawa | ............ B23K 26/032 219/121.62 |
| 2001/0054637 | A1* | 12/2001 | Hayakawa | ........... B23K 1/0056 228/102 |
| 2005/0035102 | A1* | 2/2005 | Amako | ............... B23K 1/0056 219/121.73 |
| 2010/0326967 | A1 | 12/2010 | Freitag et al. | |
| 2012/0160002 | A1* | 6/2012 | Bammer | ............. B21D 5/0209 72/19.1 |
| 2012/0196173 | A1 | 8/2012 | Kim | |

FOREIGN PATENT DOCUMENTS

| | | |
|---|---|---|
| JP | 2000-021365 A | 1/2000 |
| JP | 2001-185099 A | 7/2001 |
| JP | 2004-195490 A | 7/2004 |
| JP | 2005-153015 A | 6/2005 |
| JP | 2013-025978 A | 2/2013 |
| JP | 2013-139039 A | 7/2013 |
| JP | 2013-193081 A | 9/2013 |
| JP | 2014-010936 A | 1/2014 |

OTHER PUBLICATIONS

International Preliminary Report on Patentability dated Sep. 27, 2016 as received in Application No. PCT/JP/2015/057188.

* cited by examiner

LASER WELDING DEVICE, LASER WELDING METHOD, AND BATTERY CASING

TECHNICAL FIELD

The present invention relates to a laser welding device that welds a joining subject member with a laser beam, a laser welding method, and a battery casing welded by the laser welding device.

BACKGROUND ART

A battery obtained by welding a lid to a casing is known in the art as an object formed by welding two joining subject members with a laser welding device. Highly accurate welding between the casing and the lid is performed to maintain a high sealing degree for the battery so that electrolyte or the like does not leak from the casing. Patent Document 1 describes one example of a technique for welding the lid and the casing of the battery.

In the technique described in Patent Document 1, when the lid (battery lid) and the casing (battery can) of the battery are welded using a laser beam, at the location where the battery is welded, a distal end portion of the lid extends beyond the edge between an open upper end surface and an outer wall surface of the casing. The laser beam is emitted to an area including the distal end portion. This at least partially fills a gap at the welded portion with a molten body of the distal end portion of the lid.

Patent Document 1: Japanese Laid-Open Patent Publication No. 2000-21365

SUMMARY OF THE INVENTION

In the technique described in Patent Document 1, the gap between the casing and the lid of the battery is filled by the molten body. However, the size of the gap is not necessarily the same due to the tolerances of the casing and the lid. More specifically, a welded state of the casing and the lid may be affected by the relative position of the casing and lid and by individual differences of the battery. The joining subject members that are welding by the laser beam described above are not limited to the casing and the lid of the battery described above.

When welding is performed with a laser beam, the energy intensity distribution (hereinafter, also simply referred to as an intensity distribution), namely, the profile, of the laser beam can be changed. However, many limitations are imposed on the intensity distribution of the laser beam by a laser oscillator. Thus, it is difficult to adjust the intensity distribution.

It is an object of the present invention to provide a laser welding device, a laser welding method, and a battery casing welded by the laser welding device that performs welding with a laser beam in a further desirable manner and reduces the influence of the relative position of the joining subject members or the individual differences.

It is a further object of the present invention to provide a laser welding device and a laser welding method that sets the intensity distribution of the laser beam emitted to a joining subject in a further desirable manner.

One aspect of a laser welding device is a laser welding device that laser-welds a lid to an open portion of a casing. The laser welding device includes a laser emitting device that emits a laser beam to a joining subject portion including an inner side surface of the casing that defines the open portion and a peripheral surface of the lid that faces the inner side surface of the casing. The inner side surface of the casing and the peripheral surface of the lid are arranged to form a groove portion in between. The inner side surface of the casing and the peripheral surface of the lid include inclined surfaces that are slidable on each other and function as a sliding portion, and the groove portion has a groove width that is variable by sliding the sliding portion. A detection unit detects the groove width of the groove portion. An adjustment force application unit applies force for adjusting the groove width of the groove portion with the sliding portion to at least one of the casing and the lid. A control unit controls the force applied by the adjustment force application unit in accordance with the groove width detected by the detection unit.

One aspect of a laser welding method is a laser welding method for laser-welding a lid to an open portion of a casing. The method includes emitting a laser beam to a joining subject portion including an inner side surface of the casing that defines the open portion and a peripheral surface of the lid that faces the inner side surface of the casing. The inner side surface of the casing and the peripheral surface of the lid are arranged to form a groove portion in between. The inner side surface of the casing and the peripheral surface of the lid include inclined surfaces that are slidable on each other and function as a sliding portion. The groove portion has a groove width that is variable by sliding the sliding portion. The method further includes detecting the groove width of the groove portion with a detection unit, applying force, with an adjustment force application unit, to at least one of the casing and the lid through the sliding portion to adjust the groove width of the groove portion, and controlling, with a control unit, the force applied by the adjustment force application unit in accordance with the groove width detected by the detection unit.

One aspect of a battery casing includes a battery casing including a casing having an open portion and a lid attached to the open portion of the casing by laser welding. The casing has an inner side surface defining the open portion. The lid has a peripheral surface facing the inner side surface of the casing. The inner side surface of the casing and the peripheral surface of the lid, which serve as a joining subject portion of the laser welding, are arranged to form a groove portion in between, the inner side surface of the casing and the peripheral surface of the lid include inclined surfaces that are slidable on each other and function as a sliding portion, and the groove portion has a groove width that is variable by sliding the sliding portion.

With such a configuration or method, a molten material enters the groove portion between the casing and the lid, whereby welding can be appropriately performed. Furthermore, to appropriately perform the welding, force (hereinafter, also referred to as adjustment force) is applied to at least one of the casing and lid so that the groove width of the groove portion can be adjusted through the sliding in the sliding potion. The groove width of the groove portion being adjustable as described above. This reduces the influence of the relative position between the joining subject members or the individual differences on the welding using the laser beam. Thus, the welding is performed is a further desirable manner.

When the groove width of the groove portion is small, it is difficult for the molten material to enter the groove portion and welding is thus difficult. On the other hand, when the groove width is large, the joining subject members are less likely to be welded in a desirable manner unless a large amount of molten material is supplied. Thus, the welding subjects can be appropriately welded by appropriately setting the groove width of the groove portion between the welding subjects.

Furthermore, the casing and the lid come into contact with each other in the sliding portion. Thus, molten metal or members scattered by sputtering during the welding can be prevented from entering the casing.

Preferably, the emitted laser beam has a top-hat intensity distribution.

With such a configuration, the laser beam with the top-hat distribution can achieve more stable welding processing compared with the laser beam with the Gaussian distribution, and thus can prevent the sputtering from being occurring during the laser welding. Although a keyhole is difficult to be generated by the laser beam with the top-hat distribution, with the groove portion, a welding can be suitably performed as in a case where the keyhole is generated.

Preferably, the emitted laser beam has a Gaussian intensity distribution.

With such a configuration, even when the laser beam has the Gaussian distribution, the keyhole needs not to be formed by the laser beam because the recess is formed. Thus, the welding processing can be performed in a shorter period of time.

Preferably, the inner side surface of the casing and the peripheral surface of the lid that define the groove portion includes an end portion that protrudes in a direction the laser beam is emitted.

With such a configuration, an angled portion where heat is likely to be concentrated is arranged near the laser beam. Thus, the welding using the laser beam is quickly performed with the portion being a melting start point.

Preferably, the adjustment force application unit includes a cooler.

With such a configuration, the casing and the lid may be thermally deformed by the heat transmitted from the groove portion to its periphery. Thus, heat not required in the welding is absorbed through the adjustment force application unit, whereby the casing and the lid are prevented from thermally deforming due to the welding. Furthermore, a power generation element contained in the battery casing is less likely to be affected.

One aspect of a laser welding device is a laser welding device including a laser oscillator, a splitter that splits a laser beam output from the laser oscillator into a plurality of laser beams in accordance with a variable splitting ratio, a splitting ratio control unit that controls the splitting ratio of the laser beam split by the splitter, an intensity distribution changer that changes an intensity distribution of one of the plurality of laser beams split by the splitter, and a combiner that combines the laser beam of which the intensity distribution has been changed by the intensity distribution changer with another one of the plurality of laser beams split by the splitter.

One aspect of a laser welding method is a laser welding method for performing laser welding by emitting a laser beam to a joining subject. The method includes setting, with a splitting ratio control unit, a splitting ratio for a laser beam output from a laser oscillator; splitting, with a splitter, the laser beam into a plurality of laser beams in accordance with the splitting ratio; changing, with an intensity distribution changer, an intensity distribution of one of the plurality of laser beams split by the splitter; and combining, with a combiner, the laser beam of which the intensity distribution has been changed by the intensity distribution changer with another one of the plurality of laser beams split by the splitter.

With such a configuration or a method, the laser beam, oscillated by the laser oscillator is split, and an intensity distribution of one of the resultant light beams is changed by the intensity distribution changer, and the resultant light beam is combined with the other laser beam. Thus, the profile, which is the intensity distribution of the laser beam emitted to the joining subject, can be changed without changing the characteristics of the laser oscillator. For example, one of the laser beams obtained by the splitting has the intensity distribution changed whereas the other one of the laser beams is used as it is. Thus, the intensity distribution of the laser beam to be emitted to the joining subject can be relatively easily changed. Thus, the laser beam emitted to the joining subject can be changed to have an intensity distribution suitable for the welding.

The intensity distribution of the laser beam to be emitted to the joining subject can be controlled with a relatively simple method of controlling the splitting ratio for the laser beam with a splitter.

Intensity characteristics of the laser beam are based on the intensity distribution of the laser beam within an irradiated range such as the Gaussian distribution or the top-hat distribution, and characteristics related to the welding changes in accordance with the intensity distribution. Thus, with the laser beam that is output from the intensity distribution changer and has an intensity distribution different from that of the other laser beam, the intensity distribution of the combined laser beam is adjusted.

Preferably, the splitter splits the laser beam output from the laser oscillator into two laser beams.

With such a configuration, the splitter that is the so-called beam splitter and splits a laser beam can have a simple configuration when the laser beam is split into two.

Preferably, the splitting ratio control unit controls the splitting ratio in accordance with the groove width of the groove portion detected by the detection unit.

The inventors have learned through studies that the welding state changes during the laser welding in accordance with the groove width in the joining subject portion. Thus, with such a configuration, a control is performed to achieve an appropriate splitting ratio of the laser beam in accordance with the groove width of the groove portion. Thus, characteristics of the laser beam emitted to the joining subject portion related to the welding are favorably changed. Additionally, further accurate laser welding is achieved.

The groove width between the joining subject portions may change due to the tolerance, the individual differences, or the like. Thus, the splitting ratio of the laser beam is changed in accordance with the groove width detected by the detection unit to maintain an appropriate welding, whereby the more accurate laser beam welding is likely to be achieved.

Preferably, the laser emitting device further includes a melting state measurement device that measures a melting state of the joining subject portion, and the splitting ratio control unit controls the splitting ratio in accordance with the melting state measured by the melting state measurement device.

With such a configuration, the splitting ratio of the laser beam is controlled in accordance with the melting state of the joining subject portion, that is, a feedback control is performed. Thus, the appropriate welding of the joining subject portion is more likely to be maintained. For example, the infrared intensity of the weld pool changes in accordance with the melting state. Thus, by measuring the infrared intensity, a control can be performed to achieve characteristics of the intensity distribution of the laser beam suitable for the welding. For example, the size of the weld pool changes in accordance with the melting state. Thus, by measuring the size of the weld pool, a control can be performed to achieve characteristics of the intensity distribution of the laser beam suitable for the welding.

In the present disclosure, the influence of the relative position between the joining subject members and the individual differences is reduced when performing welding with a laser beam, and welding may be performed in a further desirable manner.

Furthermore, the intensity distribution of the laser beam emitted to the joining subject is set in a further desirable manner.

DESCRIPTION OF THE EMBODIMENTS

First Embodiment

A first embodiment of a laser welding device is described with reference to FIGS. 1 to 7.

Figure 5:
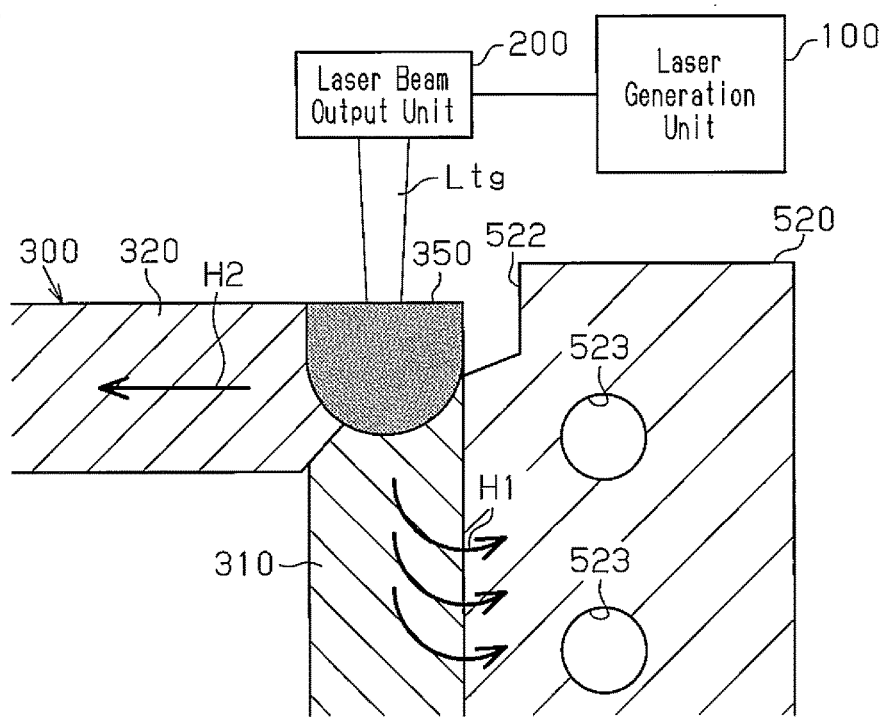
FIG. 5 is a schematic view illustrating a state of a welded portion during welding in the laser welding device illustrated in FIG. 1.

A laser welding device according to the present embodiment includes a laser generation unit 100 that has a laser oscillator, which oscillates a laser beam, and a laser beam output unit 200 that irradiates a joining subject portion with the laser beam input from the laser generation unit 100 as illustrated in FIG. 5. More specifically, the laser welding device outputs the laser beam, output from the laser generation unit 100, as an emitted laser beam Ltg from the laser beam output unit 200, and the joining subject portion of a battery 300 as a joining subject is irradiated with the emitted laser beam Ltg. In the present embodiment, the laser generation unit 100 outputs a laser beam oscillated by a semiconductor laser device for example, and the emitted laser beam Ltg has a top-hat energy intensity distribution. The laser generation unit 100 and the laser beam output unit 200 form a laser emitting device.

Figure 1:
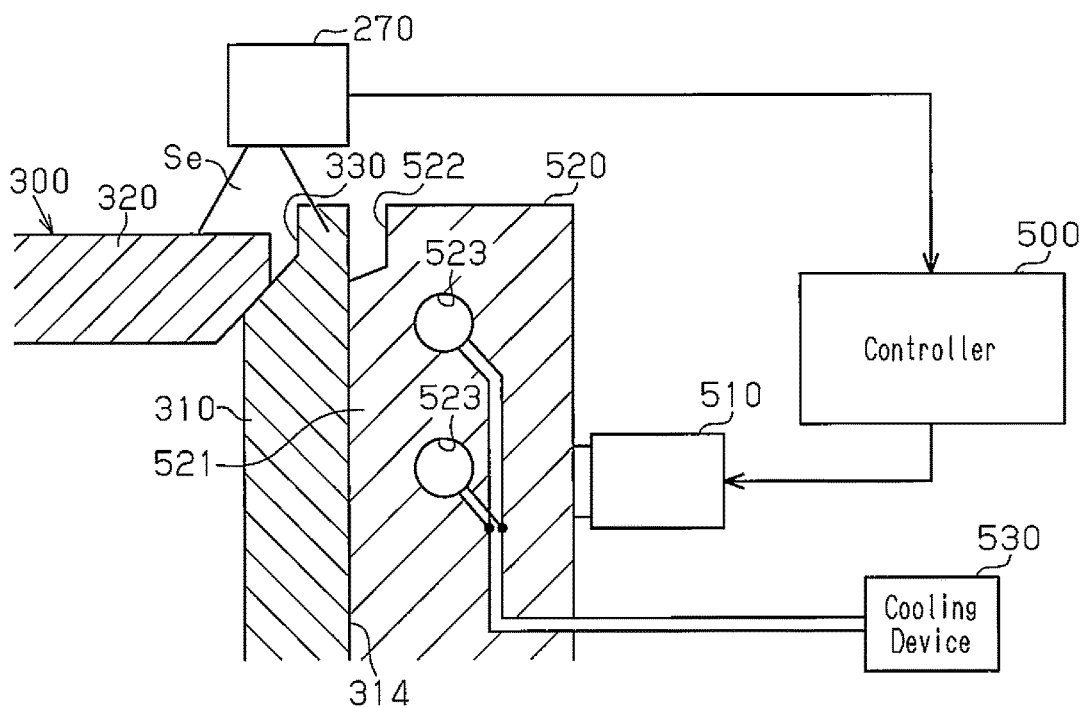
FIG. 1 is a schematic diagram illustrating a first embodiment of a laser welding device.

Next, the laser welding device according to the present embodiment will be described in detail with reference to FIG. 1. In FIG. 1, the laser generation unit 100 and the laser beam output unit 200 are omitted for the sake of illustration.

The laser welding device includes a detector 270, serving as a detection unit that detects a distance between two members that are a casing 310 and a lid 320 of the battery 300, and a controller 500, serving as a control unit to which a result of the detection by the detector 270 is input. The laser welding device further includes a pressing device 510 that forms an adjustment force application unit, which generates adjustment force applied to an outer side surface 314 of the casing 310 based on control by the controller 500, and a transmission unit 520 that forms the adjustment force application unit and transmits the adjustment force, which is generated by the pressing device 510, to the outer side surface 314 of the casing 310.

Figure 2:
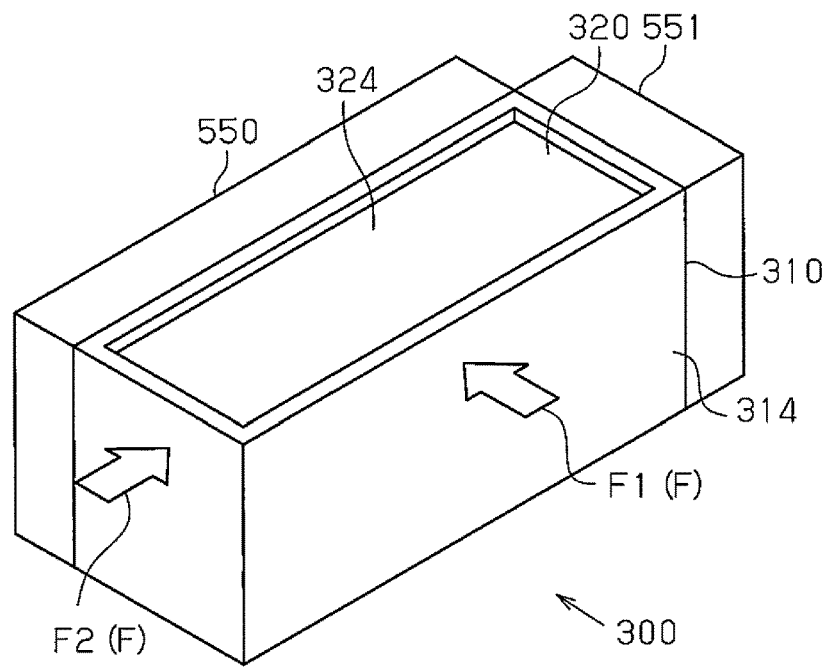
FIG. 2 is a perspective view illustrating the configuration of an example of a battery casing that is a joining subject of the laser welding device illustrated in FIG. 1 as viewed.

As illustrated in FIG. 2, the battery 300 includes the casing 310 and the lid 320 fit to the casing 310. The casing 310 and the lid 320 are formed of a metal material that includes aluminum and has a thickness of 2 mm or less. The laser welding can be performed also when the thickness is greater than 2 mm. In the present embodiment, the battery casing includes the casing 310 and the lid 320.

Although not shown in the drawing, in the present embodiment, two adjacent side surfaces of the casing 310 of the battery 300 described above respectively receive two types of adjustment force F1 and F2 (hereinafter, also simply referred to as adjustment force F) from the respective pressing devices 510. The laser welding device includes abutment jigs 550 and 551 that are each arranged on an outer side surface of the casing 310 of the battery 300 facing the side surface to which the adjustment force F is applied from the corresponding one of the pressing devices 510. Thus, the abutment jigs 550 and 551 each apply reaction force, against the adjustment force F applied to each side surface by the pressing devices 510, to the outer side surface of the corresponding one of the facing side surfaces. As a result, the adjustment force F is applied to the four side surfaces of the casing 310. The description is given below with one side surface of the casing 310 of the battery 300 as an example for the sake of description.

Figure 3:
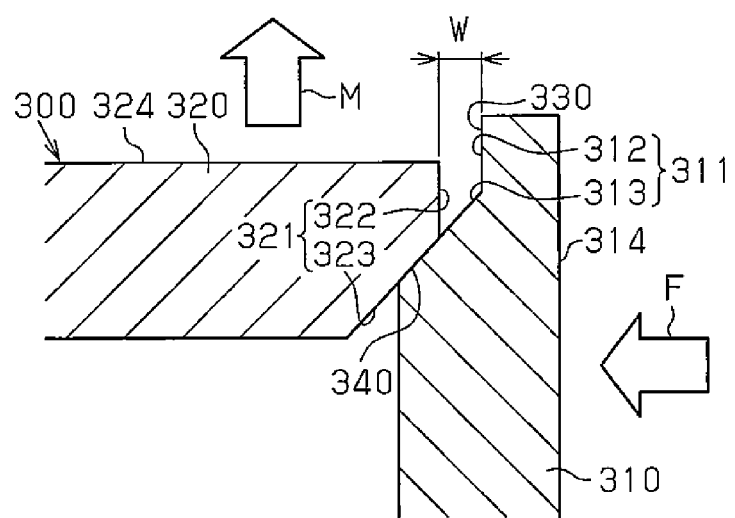
FIG. 3 is an explanatory diagram illustrating a mode in which a groove width of a groove portion in a joining subject portion of the battery casing is adjusted and reduced in the laser welding device illustrated in FIG. 1.

As illustrated in FIG. 3, the casing 310 includes an open portion 311 to which the lid 320 is fit. The open portion 311 is defined by inner side surfaces of the casing 310. In the present embodiment, the casing 310 includes an inner edge portion 312, which is formed at an edge portion of the inner side surface, and a casing inclined surface 313, which is arranged on a side closer to a bottom portion of the casing 310 than the inner edge portion 312 and protrudes toward the inner side. The open portion 311 is defined by the inner edge portion 312 and the casing inclined surface 313. The inner edge portion 312 forms an opening larger than the lid 320, and thus the lid 320 can pass through the opening. The casing inclined surface 313 forms an opening, larger than the lid 320, on a side of an opening end of the casing 310, and forms an opening smaller than the lid 320 on a side of the bottom portion of the casing 310. The casing inclined surface 313 is formed as a surface that connects between the larger and the smaller openings. Thus, in the casing 310, the lid 320, fit to the open portion 311, can pass through the inner edge portion 312 without coming into contact with the inner edge portion 312, and come into contact with the casing inclined surface 313 to be held at the contact position.

The lid 320 includes an outer surface 324, which serves as a surface of the casing 310 facing outward, and a peripheral surface 321, which faces the open portion 311 of the casing 310. The peripheral surface 321 includes an outer edge portion 322, which faces the inner edge portion 312 of the casing 310, and a lid inclined surface 323, which inclines toward the center of the lid 320 and extends toward an inner surface that is an opposite surface of the outer surface 324 of the lid 320 from the outer edge portion 322. The outer edge portion 322 has an outer circumference defining a size smaller than the inner edge portion 312 and comes into contact with the casing inclined surface 313. The lid inclined surface 323 faces the casing inclined surface 313 and has an inclined angle to be in surface contact with the casing inclined surface 313. Thus, when the lid 320 is fit in the open portion 311 of the casing 310, the lid 320 passes through the inner edge portion 312 of the casing 310, with the lid inclined surface 323 being in contact with the casing inclined surface 313 by surface contact and the like. All things considered, the lid 320 is held while being fit in the open portion 311 of the casing 310 with the lid inclined surface 323 being in contact with the casing inclined surface 313.

When the lid 320 is thus fit in the open portion 311 of the casing 310, a groove portion 330 with a groove width W is formed between the inner edge portion 312 of the casing 310 and the outer edge portion 322 of the lid 320. The groove width W is formed of a distance corresponding to a difference between the size of the opening defined by the inner edge portion 312 of the casing 310 and the size defined by the outer edge portion 322 of the lid 320, that is, a distance that is one-half the difference for example. The lid inclined surface 323 and the casing inclined surface 313 come into slidable contact with each other to form a sliding portion 340.

In the present embodiment, the heights of a distal end portion of the open portion 311 and the outer surface 324 of the lid 320 of the casing 310 are set to be substantially the same when the inner edge portion 312 and the outer edge portion 322 are in contact with each other. Thus, a larger groove width W of the groove portion 330 leads to a larger amount of the distal end portion of the open portion 311 of the casing 310 protruding beyond the outer surface 324 of the lid 320. Thus, when the groove portion 330 is irradiated with the emitted laser beam Ltg, the distal end portion of the casing 310 protrudes in the direction the emitted laser beam Ltg is emitted.

In the sliding portion 340, the casing inclined surface 313 and the lid inclined surface 323 are in contact with each other. Thus, when the adjustment force F toward the lid 320 is applied to the outer side surface 314 of the casing 310, the casing inclined surface 313 and the lid inclined surface 323 slide on each other. As a result, the lid inclined surface 323 slides upward on the casing inclined surface 313, or the casing inclined surface 313 slides downward on the lid inclined surface 323, whereby the lid 320 moves in a direction M on a side of the outer surface 324 relative to the casing 310.

Figure 4:
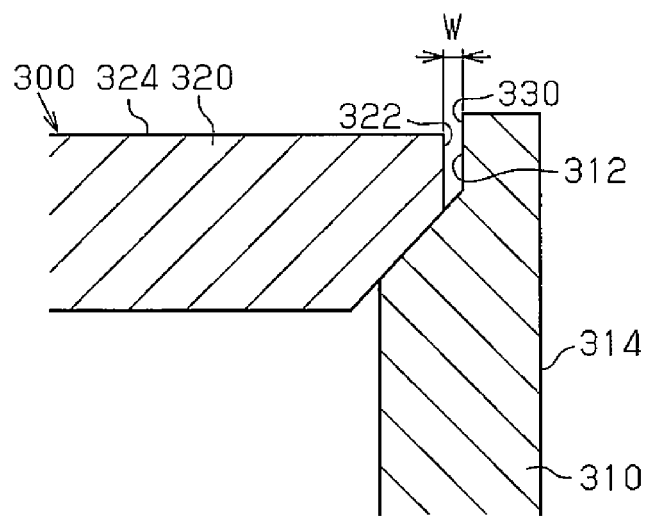
FIG. 4 is a schematic view illustrating an example of a state where the groove width of the groove portion in the joining subject portion of the battery casing is adjusted to an appropriate width in the laser welding device illustrated in FIG. 1.

As illustrated in FIG. 4, the movement described above brings the inner edge portion 312 and the outer edge portion 322, facing each other, closer to each other, whereby the groove width W of the groove portion 330 is reduced. In this manner, in the battery 300 of the present embodiment, when the adjustment force F is applied from the pressing device 510 to the outer side surface 314 of the casing 310, the groove width W of the groove portion 330, between the casing 310 and the lid 320, changes.

In the present embodiment, an area including the groove portion 330 between the casing 310 and the lid 320 is the joining subject portion of the laser welding. More specifically, the joining subject portion includes the inner side surfaces (312 and 313) of the casing 310 defining the open portion 311 and the peripheral surface 321 of the lid 320, facing the inner side surface of the casing 310, and the groove portion 330 is formed between the inner side surface of the casing 310 and the peripheral surface 321 of the lid 320. In other words, the inner side surfaces of the casing 310, defining the open portion 311 and the peripheral surface 321 of the lid 320, are joining subject portions facing each other, and are arranged with the groove portion 330 formed in between. The groove width W of the groove portion 330 can be changed in accordance with the sliding between the lid inclined surface 323 and the casing inclined surface 313. As described above, the groove portion 330 having the groove width variable groove width W with which the groove, between the casing 310 and the lid 320 that are welded to each other, is formed in the joining subject portions.

The sliding portion 340 is formed more on the inner side of the casing 310 than the groove portion 330 to be welded. Thus, when the groove portion 330 is molten for the welding, the molten material is blocked by the sliding portion 340 and thus is prevented from flowing toward the inner side of the casing 310. The molten material may be scattered by sputtering occurring in a weld pool during the welding. The sliding portion 340 can also prevent the scattered material from entering into the casing 310. The lid 320 is welded to the casing 310 while the battery 300 incorporates a power generation element, and thus there is a risk that battery quality is degraded when a foreign object enters into the casing 310 during the welding. In the present invention, molten metal and the material scattered by the sputtering can be prevented from entering into the casing 310, whereby the battery quality is prevented from degrading.

As illustrated in FIG. 1, the detector 270 detects the groove width W of the groove portion 330 by laser measurement using a measurement laser beam Se. For example, the measurement laser beam Se is moved for scanning across the groove portion 330, whereby the detector 270 measures a length of the distance between the detector 270 and a joining subject (battery 300), recognizes a portion from which a long length measurement result is obtained as the groove portion 330, and detects the groove width W of the groove portion 330 thus recognized. The detector 270 may recognize the groove portion 330 and the groove width W thereof through image recognition. The detector 270 outputs the groove width W of the groove portion 330 thus detected to the controller 500.

The groove width W detected by the detector 270 is input to the controller 500. The controller 500 calculates adjustment force in accordance with the groove width W thus input, and controls the pressing device 510 based on the adjustment force thus calculated. More specifically, the controller 500 controls the adjustment force output from the pressing device 510 so that the groove width W is adjusted to a target width with which the welding can be appropriately performed. Thus, the controller 500 performs feedback control on the adjustment force output from the pressing device 510 based on the difference between the groove width W and the target width. The groove width W is controlled by deformation and deflection of the casing 310 caused by the adjustment force F thus applied. All things considered, the groove width W of the groove portion 330 is favorably adjusted, regardless of the influence on the groove width W due to the relative position between the members or the individual differences of the casing 310 and the lid 320.

The target width may be set as, for example, the width corresponding to all or one-half of the welded depth, that is, the penetration depth. More specifically, for example, when a member having a thickness of 1 mm is to be welded to one-half of the depth, the target width may be set to 0.05 to 0.5 mm. The controller 500 may adjust the groove width W of the groove portion 330 before the welding starts, and the welding may be performed with the groove width thus adjusted before the welding. The controller 500 may perform control in such a manner that the groove width W of the joining subject portion to be welded is successively checked while the welding is in process, and the checked groove width W is successively adjusted to the target width. The groove width W is not limited to the value described above, and may be appropriately set to a suitable value corresponding to a material of the welded member and a condition during the welding (environment temperature, laser beam output, or the like).

The pressing device 510 is an actuator such as an air cylinder, a piezoelectric actuator, or a motor, and adjusts the adjustment force for pressing the outer side surface 314 of the casing 310, based on the control performed by the controller 500. For example, the controller 500 outputs the adjustment force corresponding to an instruction value input from the controller 500. The control may be performed based on an instruction on a length (stroke) in which a piston of the pressing device 510 moves into and out of a cylinder.

The transmission unit 520 is arranged between the pressing device 510 and the outer side surface 314 of the casing 310, and transmits the adjustment force generated by the pressing device 510 to the outer side surface 314 of the casing 310. More specifically, the transmission unit 520 is a member having a higher rigidity than the outer side surface 314 of the casing 310, and transmits the adjustment force, input from the pressing device 510, to the outer side surface 314 of the casing 310 with a small amount of loss.

The transmission unit 520 includes a coolant path 523 through which a coolant such as cooling water for example can path. The coolant path 523 has one end connected to a coolant supply port of the cooling device 530 as a cooler that supplies the coolant, and the other end connected to a coolant collection port of the cooling device 530. When the coolant is supplied to the coolant path 523, the transmission unit 520 is cooled and absorbs heat transmitted from the outer side surface 314 of the casing 310 at the time of welding. During the laser welding, the joining subject portion needs to be heated to such a level that metal melts, but this may involve risks, regarding portions that are not welded, such as the higher temperature transmitted from the joining subject portion affecting the power generation element in the casing 310 and causing thermal strain or other deformation of the casing 310. Thus, the transmission unit 520 is cooled to prevent the temperature at the portion that needs not to be heated at the time of welding from rising, whereby the power generation element in the casing 310 is prevented from being affected and the deformation of the casing 310 is prevented, at the time of welding.

When the groove width W changes due to the thermal deformation of the casing 310 during welding, the welding may not be appropriately performed due to the change in the groove width. Thus, the thermal deformation of the casing is prevented so that the welding is more likely to be appropriately performed. Such change of the groove width W due to heat may be detected by the detector 270 and the groove width W may be adjusted by applying the adjustment force F corresponding to the change.

The transmission unit 520 includes a non-contact portion 522 formed as a recess at a portion close to the joining subject portion. More specifically, a contact portion 521 as a portion of the transmission unit 520 other than the non-contact portion 522 comes into contact with the outer side surface 314 of the casing 310. The non-contact portion 522 has a depth from the distal end portion of the open portion 311 of the casing 310 to a depth corresponding to the penetration depth of the welded portion, whereby the transmission unit 520 does not come into contact with the outer side surface 314 of the casing 310. More specifically, when the portion of the transmission unit 520 close to the joining subject portion is cooled, the transmission unit 520 may absorb the heat required for the welding to adversely affect the welding. Thus, the non-contact portion 522 is provided, so that the cooling does not adversely affect the welding.

This is described more in detail with reference to FIG. 5. Specifically, when the joining subject portion, including the groove portion 330, is irradiated with the emitted laser beam Ltg for the welding, the melting proceeds with the end portion of the inner edge portion 312 of the casing 310, protruding toward the laser beam output unit 200, as a melting start point. As a result, a weld pool 350 formed of a molten metal material is formed. Here, with the groove width W of the groove portion 330 adjusted to the target width, the welding can be performed with the melting reaching a deeper point. By adjusting the groove width W to the target width, the welding can be appropriately performed with an appropriate groove width W corresponding to a welding condition.

The inventors of the present invention have found out the following point. Generally, in the welding, by generating a keyhole (recess formed on the weld pool 350 by a material heated and thus evaporated), the molten material flows into the keyhole, whereby melt processing can be executed to a deep point of a member. Thus, the weld processing by the laser welding can be favorably executed to a deep point of a member by generating the keyhole by the heat of the laser beam. For example, in a case of the laser welding, when a laser beam with a Gaussian energy intensity distribution is emitted, the keyhole can be formed at a high energy portion at the center of the laser beam. However, the Gaussian distribution laser beam needs to be controlled highly accurately, because of high processing sensitivity such as possible quick change in a welding state, low robust stability, risk of overheating or penetration due to a slightest excess of the irradiation time, high accuracy required for the laser beam irradiated position, and the like.

Thus, in the present embodiment, the top-hat emitted laser beam Ltg, which is highly stable and relatively easily controlled, is used for the welding. The top-hat emitted laser beam Ltg has an averaged intensity distribution, and thus requires a predetermined period of laser beam irradiation time to generate the keyhole. Thus, the keyhole is difficult to generate, and the welding cannot be appropriately performed or requires a long period of time.

Thus, in the laser welding device of the present embodiment, the groove width W is adjusted so that the keyhole or a recess with the same function as the keyhole is generated in the weld pool 350 at the welded portion. With the recess thus formed in the weld pool 350, the welding can be favorably performed as in the case where the keyhole is generated. With the recess generated, the welding can be performed not only on the surface of a member but to a predetermined depth. Thus, the welding is stably performed compared with the so-called heat conduction welding, in which a material is molten with heat of the laser emitted onto a flat surface is gradually transmitted toward the inside from the surface. As described above, the joining subject portion with the groove width W adjusted to the target width is welded, whereby the weld processing can be favorably executed without controlling the intensity of the emitted laser beam Ltg or the length of the irradiation time with accuracy high enough to generate the keyhole.

In the present embodiment, welding is performed with the adjustment force F applied to each of the four side surfaces of the casing 310, so that the groove width W is controlled at all the four surfaces. If the welding is performed with the groove width W for each side surface, the groove width W needs to be adjusted with the other side surfaces and the like welded, and thus a range in which the groove width W can be adjusted is limited in some cases.

When the laser welding is performed with the emitted laser beam Ltg, heat of the weld pool 350 and the like are transmitted to the casing 310 and the lid 320. Thus, the heat transmitted to the casing 310 and the lid 320 may cause deformation of the casing 310 and the lid 320 due to heat. Thus, in the present embodiment, the transmission unit 520 cools the outer side surface 314 of the casing 310 whereby heat H1 caused by the welding is absorbed by the transmission unit 520. When the heat H1 is absorbed by the transmission unit 520, the amount of heat H2 transmitted to the lid 320 is reduced. Thus, heat accumulated in the casing 310 and the lid 320 is reduced, whereby the power generation element is prevented from being adversely affected and the casing 310 and the lid 320 are prevented from deflecting and the like due to heat.

Operations of the present embodiment will now be described.

As described below with reference to FIGS. 6 and 7, in the present embodiment, the groove portion 330 is arranged at the joining subject portion where the laser welding is performed, whereby the welding on the joining subject portion can be performed to quickly reach a deep position.

Figure 6:
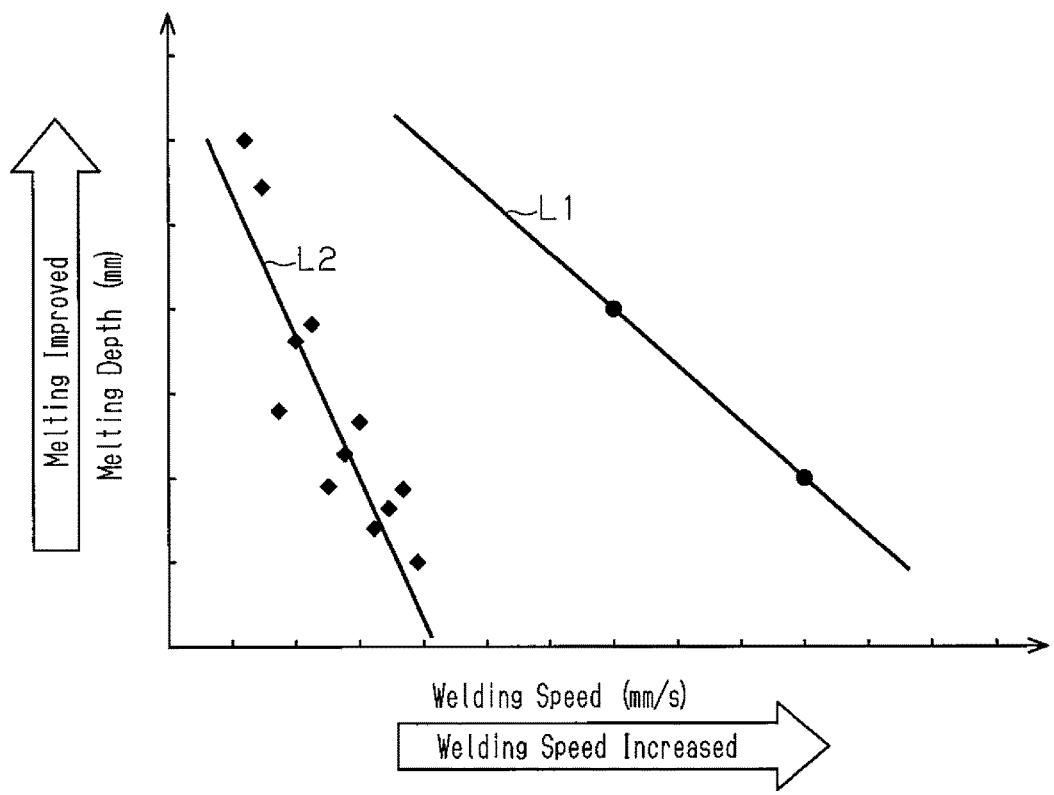
FIG. 6 is a graph illustrating the relationship of the presence of the groove portion in the joining subject portion with respect to the welding speed and the melding depth.

FIG. 6 is a graph illustrating a relationship between a welding speed and a welding depth in a case where a flat surface of a member is welded with laser and a case where two members with the groove portion 330 arranged in between are welded with laser. Here, the case of the flat surface is assumed to be equivalent to a state where the laser welding is performed on two members that are in contact with each other with no groove portion formed in between. More specifically, a graph L1 represents a relationship where the joining subject portion including the groove portion is welded and a graph L2 represents a relationship in a case where the flat plate with no groove portion is welded. The graphs indicate that, to obtain the same welding depth, the case where the member includes no groove portion requires a longer period of time in the laser welding for welding two members compared with the case where the members include the groove portion.

Figure 7:
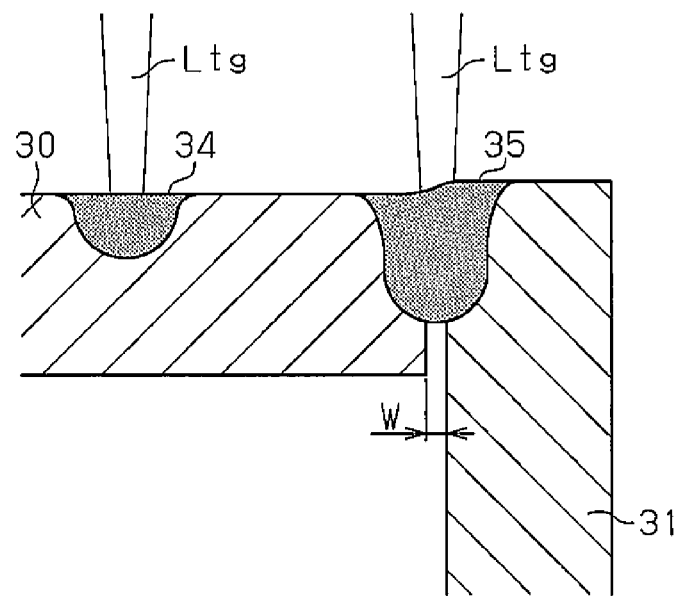
FIG. 7 is a schematic view illustrating the relationship of the presence of the groove portion in the joining subject portion with respect to the welding speed and the melding depth.

FIG. 7 illustrates a mode of a weld pool 34 formed by performing the laser welding on the flat surface of the member, and a mode of a weld pool 35 formed by performing the laser welding on the two members including the groove portion. Also in this case, the flat surface is assumed to be equivalent to the state where the laser welding is performed on the two members in contact with each other without forming the groove portion. The laser welding on the joining subject portion with no groove portion is thermal conduction welding with which the weld pool 34 is difficult to be deep and thus the welding processing is difficult to reach a deep point.

On the other hand, when the laser welding is performed on the joining subject portion including the groove portion, the emitted laser beam Ltg enters into the groove portion with the groove width W between first and second members 30 and 31, whereby the energy is transmitted to a deep position. The melting quickly proceeds by the emitted laser beam and convection of the molten metal, whereby the weld pool 35 becomes deeper and the welding processing is executed to a deep position. All things considered, the welding that is the same as that in the case where the keyhole is generated is performed on the joining subject portion including the groove portion.

With the laser welding device, the laser welding method, and the battery casing welded by the laser welding device of the present embodiment, the welding using a laser beam can be more appropriately performed with an influence of relative position between joining subject members or individual differences on the welding reduced.

As described above, with the laser welding device, the laser welding method, and the battery casing welded by the laser welding device of the present embodiment, the following list of effects can be obtained.

(1) A molten material enters the groove portion 330 between the casing 310 and the lid 320, whereby the welding can be appropriately performed. Furthermore, the groove width W of the groove portion 330 can be adjusted by causing sliding in the sliding portion 340 by applying force (the adjustment force F) to at least one of the casing 310 and the lid 320, so that the welding is more appropriately performed. As described above, the groove width W of the groove portion 330 is adjustable. Thus, when the welding is performed with the emitted laser beam Ltg, the influence of the relative position of the casing 310 and the lid 320 serving as the joining subjects and individual differences may be reduced. This allows welding to be performed in a further desirable manner.

With a smaller groove width W of the groove portion 330, the molten material becomes more difficult to enter and thus the welding becomes more difficult to be appropriately performed. With a larger groove width W, the casing 310 and the lid 320 as the joining subjects are less likely to be appropriately welded unless a large amount of molten material is supplied. Thus, the casing 310 and the lid 320 can be appropriately welded to each other by appropriately setting the groove width W of the groove portion 330 between the casing 310 and the lid 320.

The casing 310 and the lid 320 come into contact with each other at the sliding portion 340, whereby the molten metal generated by the welding and the member scattered by the sputtering can be further prevented from entering into the casing 310.

(2) The top-hat distribution laser beam can achieve further stable weld processing than the Gaussian distribution laser beam. This limits the occurrence of sputtering during the laser welding. Although the keyhole is difficult to generate with the top-hat distribution laser beam, the groove portion 330 allows welding to be performed in a favorable manner like when the keyhole is generated.

(3) The distal end portion of the casing 310 forming the groove portion 330, that is, the inner edge portion 312 protrudes in the direction the emitted laser beam Ltg is emitted. Thus, an angle is formed in such a manner that a portion where the heat is likely to be concentrated is arranged close to the emitted laser beam Ltg, and the welding by the laser beam starts at the portion can quickly proceed.

(4) The heat transmitted from the groove portion 330 to the periphery thereof may cause thermal deformation of the casing 310 and the lid 320. Thus, the heat not required in the welding is absorbed by the transmission unit 520, whereby the casing 310 and the lid 320 are prevented from deforming due to heat while the welding is in process.

Modification of First Embodiment

The first embodiment described above can be implemented in the following modes.

In the embodiment described above, an example is described where the adjustment force F is applied to the four side surfaces of the casing 310 to adjust the groove width W. However, this should not be construed in a limiting sense, and the adjustment force may be applied to one to three surfaces. For example, the adjustment force may be applied to two side surface facing each other in a single direction, or may be applied to any one to three side surfaces by fixing a bottom surface. Here, the groove width W is adjusted in a partially welding state and the like where the adjustment range of the groove width W is limited. Still, the groove width is adjusted by the deflection of the casing (or the lid) even when three of the four sides are welded for example. Thus, a wider application range of the laser welding device can be achieved.

In the embodiment described above, an example is described where the adjustment force output from the pressing device 510 is applied to two adjacent side surfaces and the adjustment force as reaction force from the abutment jigs 550 and 551 is applied to the other two side surfaces. However, this should not be construed in a limiting sense. At least one of the other two side surfaces may receive the adjustment force from a pressing device in a corresponding manner as long as appropriate adjustment force can be applied. Thus, a higher degree of freedom in design of the laser welding device can be achieved.

In the embodiment described above, the top-hat distribution laser is used for the welding processing. However, this should not be construed in a limiting sense, and a Gaussian distribution laser may be used for the welding processing. When the Gaussian distribution laser is used, generally, the laser is emitted for a predetermined period of time to form a keyhole. With the groove portion, the keyhole can be formed in a short period of time, whereby the time required for the laser welding can be shortened. When the Gaussian distribution laser is used, the energy is more concentrated and thus the irradiation range is smaller than in the case of the top-hat. Still, the welding depth can be ensured by the groove portion even when the welding width is small. Thus, a wider application range of the laser welding device can be achieved.

In the embodiment described above, an example is described where the adjustment force is applied to the outer side surface 314 of the casing 310 to adjust the groove width W. However, this should not be construed in a limiting sense, and the adjustment force may be applied to the lid as long as the groove width W is adjusted.

Figure 8:
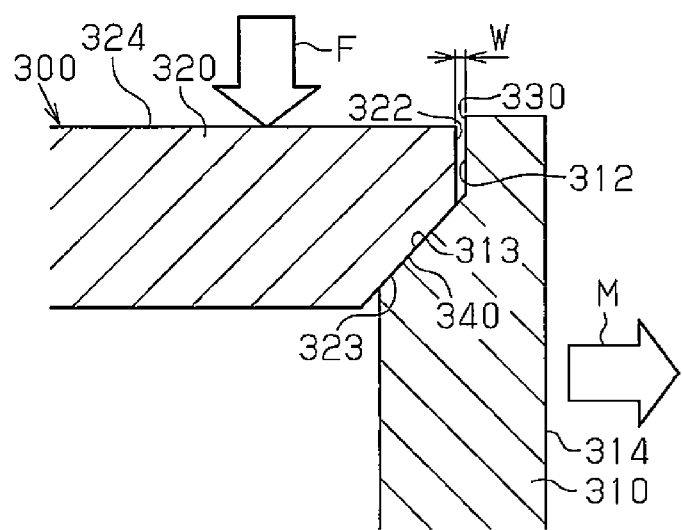
FIG. 8 is an explanatory diagram illustrating how the groove width of the groove portion in the joining subject portion of the battery casing is adjusted to be increased in another embodiment of the laser welding device.

For example, as illustrated in FIG. 8, the adjustment force F toward the bottom portion of the casing 310 is applied to the outer surface 324 of the lid 320 so as to act on the sliding portion 340. In this manner, the casing inclined surface 313 may be pressed and widened by the lid inclined surface 323, that is, the outer side surface 314 of the casing 310 may be widened in an outward direction M. Thus, the groove width W of the groove portion 330 is increased. More specifically, when the groove width W is smaller than the target width, the force is applied to press the outer surface 324 of the lid 320, whereby the groove width W of the groove portion 330 can be easily increased. As described above, the groove width can be increased in a simple operation, whereby a more convenient laser welding device can be provided.

In the embodiment described above, an example is described where the groove width W is changed by pressing the outer side surface 314 of the casing 310. However, this should not be construed in a limiting sense. The outer side surface of the casing may be pulled in the outward direction as long as the groove width is changed through the sliding in the sliding portion. For example, when the outer side surface is pulled, the open portion of the casing is widened, and thus the lid inclined surface slides downward on the casing inclined surface to move toward the bottom portion of the casing. Such a movement moves the surfaces of the inner edge portion and the outer edge portion away from each other. Thus, the groove width of the groove portion can be changed to be increased. For example, when using the adjustment force as pressing force and pulling force, the groove width can be decreased or increased. When the force is applied to the lid, in the same manner, pulling force may be applied. Thus, a wider applicable range of the laser welding device can be achieved.

In the embodiment described above, an example is described where the transmission unit 520 is cooled. However, this should not be construed in a limiting sense, and the abutment jigs may be cooled. Thus, a higher degree of freedom in design of the laser welding device can be achieved.

In the embodiment described above, an example is described where the cooling medium is water. However, this should not be construed in a limiting sense. The cooling medium may be any coolant that can cool the transmission unit, and thus may be liquid other than water or gas such as air instead of liquid. Thus, a higher degree of freedom in design of the laser welding device can be achieved.

In the embodiment described above, an example is described where the transmission unit 520 is forcibly cooled through supply of the coolant. However, this should not be construed in a limiting sense, and the transmission unit may not be forcibly cooled. The transmission unit, which is not intensely heated at the time of welding or does not cause any problem by being heated for a limited period of time, may be naturally cooled. Thus, a higher degree of freedom in design of the laser welding device can be achieved.

In the embodiment described above, an example is described where the non-contact portion 522 is provided to the transmission unit 520. However, this should not be construed in a limiting sense. Any configuration, such as that in which a member with low thermal conductivity is arranged at the portion where the non-contact portion is formed, may be employed as long as the portion close to the joining subject portion is not cooled. Thus, a higher degree of freedom in design of the laser welding device can be achieved.

In the embodiment described above, an example is described where the lid 320, smaller than the open portion 311, is fit to the casing 310. However, this should not be construed in a limiting sense. The open portion of the casing and the lid may have such a size relationship that the lid is as large as or larger than the open portion of the casing, as long as the groove portion is formed in the joining subject portion. When the groove portion is formed as the position or the orientation is changed, the position of the casing or the orientation of the emitted laser may be adjusted in such a manner that the welding is appropriately performed on the groove portion. Thus, a wider applicable range of the laser welding device can be achieved.

In the embodiment described above, an example is described where the height of the distal end portion of the open portion 311 of the casing 310 becomes substantially the same as the height of the outer surface 324 of the lid 320 when the inner edge portion 312 and the outer edge portion 322 are in contact with each other. However, this should not be construed in a limiting sense, and a step may be formed in between when the inner edge portion and the outer edge portion are in contact with each other. Thus, a higher degree of freedom in design of the laser welding device can be achieved.

In the embodiment described above, an example is described where the distal end portion of the inner edge portion 312 of the casing 310 protrudes beyond the outer surface 324 of the outer edge portion 322 of the lid 320. However, this should not be construed in a limiting sense. The outer surface of the outer edge portion of the lid may be at the same height as the distal end portion of the inner edge portion of the casing or may protrude beyond the distal end portion of the inner edge portion of the casing. For example, with the outer surface of the outer edge portion of the lid protruding, the melting start point may also be set at the lid. Thus, a higher degree of freedom in design of the laser welding device can be achieved.

In the embodiment described above, an example is described where the lid inclined surface 323 extends toward the inner side of the casing 310 beyond the casing inclined surface 313. However, this should not be construed in a limiting sense. The lid inclined surface may not extend toward the inner side of the casing beyond the casing inclined surface, as long as the casing inclined surface comes into contact with the lid inclined surface. Thus, a higher degree of freedom in design of the laser welding device and the battery casing can be achieved.

In the embodiment described above, an example is described where the casing inclined surface 313 and the lid inclined surface 323 come into surface contact with each other. However, this should not be construed in a limiting sense. At least part of the portion where the casing inclined surface and the lid inclined surface come into contact with each other may be formed by a contact mode other than the surface contact such as line contact or point contact for example. Furthermore, a slight gap may be provided in between. The molten metal or the member scattered by the sputtering is prevented from entering between the casing inclined surface and the lid inclined surface also when part of the contact portion is formed by the line contact or the point contact. The molten metal and the like are less likely to enter into the battery casing even when the slight gap is provided, as long as the welding is appropriately performed. Thus, a higher degree of freedom in design of the laser welding device can be achieved.

In the embodiment described above, an example is described where the battery 300 is welded. However, this should not be construed in a limiting sense, and the welding subject may be any object requiring the welding processing other than batteries. Thus, a wider applicable range of the laser welding device can be achieved.

In the embodiment described above, an example is described where the joining subject is formed of a metallic member including aluminum. However, this should not be construed in a limiting sense. The member as the joining subject may be any object made of a material that can be welded by a laser beam such as a metallic material not including aluminum or a member made of a material other than metal such as resin, for example. Thus, a higher degree of freedom in design, a wider applicable range, and the like of the laser welding device can be achieved. Furthermore, a higher degree of freedom in design of the battery casing can be achieved.

Second Embodiment

A second embodiment of the laser welding device will now be described with reference to FIG. 9. The laser welding device of the second embodiment may be applied to the laser welding device of the first embodiment, or may be used independently from the first embodiment.

Figure 9:
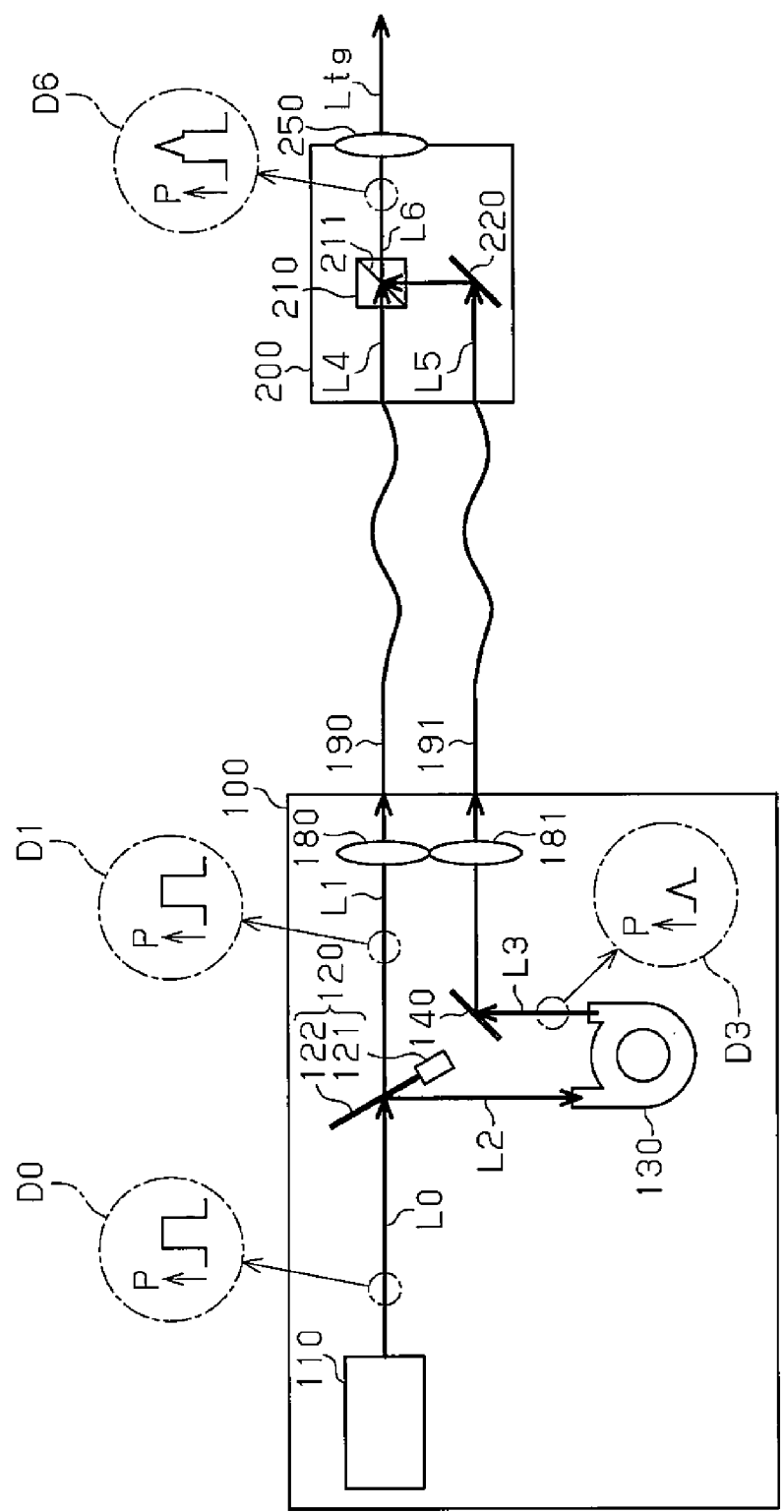
FIG. 9 is a schematic diagram illustrating the configuration of a second embodiment of the laser welding device.

As illustrated in FIG. 9, the laser welding device irradiates the joining subject portion with the emitted laser beam Ltg, generated based on an oscillated laser beam L0 output from the laser oscillator 110, to perform the laser welding.

The laser welding device of the second embodiment includes the laser generation unit 100 that oscillates and outputs the laser beam and the laser beam output unit 200 that irradiates the joining subject portion with the oscillated laser beam L0, which is output from the laser generation unit 100. In the laser welding device, the laser generation unit 100 and the laser beam output unit 200 are connected to each other in such a manner that the laser beam can be transmitted therebetween, by using first and second optical fibers 190 and 191 through which the laser beam can be transmitted. More specifically, the laser beam can be transmitted from the laser generation unit 100 to the laser beam output unit 200 through the first and second optical fibers 190 and 191. The first and second optical fibers 190 and 191 are each a member that is suitable for transmitting a laser beam from a semiconductor laser.

The laser generation unit 100 includes the laser oscillator 110 that oscillates the laser beam and a splitter 120 that splits the oscillated laser beam L0, which is output from the laser oscillator 110, in accordance with a variable splitting ratio. The laser generation unit 100 includes an intensity distribution changer 130 that changes the so-called profile that is an intensity distribution as a distribution of energy intensity P of a second laser beam L2, as one of the laser beams obtained by the splitting by the splitter 120. The laser generation unit 100 includes a first collimator lens 180 that collimates a first laser beam L1, as the other one of the laser beams obtained by the splitting by the splitter 120, into parallel light. The laser generation unit 100 includes a total reflection mirror 140 that changes a traveling direction of a third laser beam L3, with a changed intensity distribution, which is output from the intensity distribution changer 130. The laser generation unit 100 further includes a second collimator lens 181 that collimates the third laser beam L3, the traveling direction of which is changed by the total reflection mirror 140, into parallel light. The laser generation unit 100 inputs the first laser beam L1, output as the parallel light from the first collimator lens 180, into the first optical fiber 190, and inputs the third laser beam L3, output as the parallel light from the second collimator lens 181, into the second optical fiber 191.

The laser oscillator 110 is the so-called semiconductor laser and oscillates a laser diode to output the oscillated laser beam L0. The laser oscillator 110 outputs the oscillated laser beam L0 as a laser beam that has a wavelength of, for example, 880 to 980 nanometers (nm) and thus can be used for the laser welding. The laser oscillator 110 outputs the oscillated laser beam L0 with the so-called top-hat intensity distribution D0 (rectangular distribution) of energy intensity P. The semiconductor laser can easily output the laser beam with the top-hat intensity distribution, whereby the laser oscillator 110 can have a simple configuration that is expected to be achieved with a low cost.

Well known types of the intensity distribution (profile) of the energy intensity P of the laser beam include a top-hat distribution and a Gaussian distribution. The top-hat distribution is a rectangular distribution of the energy intensity P as represented by an intensity distribution D1 in FIG. 9 for example. The Gaussian distribution is a normal distribution of the energy intensity P as represented by an intensity distribution D3 in FIG. 9 for example. More specifically, a diameter of an irradiation area in which the intensity of the laser beam is significantly higher than a background level is defined as an irradiation diameter $\Phi 1$. For example, the significantly larger intensity of the laser beam is an area irradiated with an output with an intensity equivalent to 1% of the maximum intensity of the laser beam or more. The maximum intensity of the laser beam is defined as a maximum value M, a diameter of the portion where the value of the irradiation intensity is 0.9 M is defined as a 0.9 M portion intensity irradiation diameter GQ. Thus, the 0.9 M portion intensity irradiation diameter GQ is a diameter of an area irradiated with light the intensity of which is 10% of the maximum value M of the laser beam or more. Under the conditions described above, the top-hat distribution and the Gaussian distribution can be defined by a ratio of the 0.9 M portion intensity irradiation diameter GQ to the irradiation diameter $\Phi 1$. Thus, in the second embodiment, the top-hat intensity distribution is an intensity distribution of the laser beam satisfying the following Formula (1) as a relational formula.

$$GQ/\Phi 1 \geq 0.9 \quad (1)$$

The Gaussian intensity distribution is an intensity distribution of the laser beam satisfying the following Formula (2) as a relational formula.

$$GQ/\Phi 01 < 0.8 \quad (2)$$

The intensity distribution of the energy intensity P is hereinafter simply referred to as an intensity distribution, the top-hat intensity distribution is hereinafter simply referred to as a top-hat distribution, and a Gaussian intensity distribution is hereinafter simply referred to as a Gaussian distribution, for the sake of description.

The splitter 120 is the so-called beam splitter, and splits the oscillated laser beam L0 as incident light into two light beams that are the first laser beam L1 and the second laser beam L2. In the second embodiment, the first laser beam L1 is used for the laser welding with the intensity distribution that is the top-hat distribution unchanged, and the second laser beam L2 is used for the laser welding with the intensity distribution changed to the Gaussian distribution.

The splitter 120 has a variable splitting ratio between transmission and reflectance of the laser beam, and includes a control unit 121 (splitting ratio control unit), which controls the splitting ratio, and a splitter unit 122, which transmits or reflects an incident laser beam. The control unit 121 changes the transmission and the reflectance achieved by the splitter unit 122, and thus can change the splitting ratio. For example, when the transmission and the reflectance achieved by the splitter unit 122 are changed in accordance with the position of the splitter unit 122, the control unit 121 controls the position of the splitter unit 122 with respect to the oscillated laser beam L0 that has been input. When the transmission and the reflectance achieved by the splitter unit 122 are changed in accordance with the angle of the splitter unit 122, the control unit 121 controls the angle of the splitter unit 122 with respect to the oscillated laser beam L0 that has been input.

A fiber laser resonator is used as the intensity distribution changer 130 and changes the intensity distribution of the oscillated laser beam L0 that has been input. The fiber laser resonator includes an optical fiber as a resonation medium that amplifies the laser beam that has been input. The intensity distribution changer 130 includes an input unit that inputs the laser beam to one end of the optical fiber and an output unit that outputs the laser beam from the other end of the optical fiber. Thus, the intensity distribution changer 130 inputs the second laser beam L2 from the input unit and outputs the third laser beam L3, amplified while passing through the optical fiber, from the output unit. In the second embodiment, when the second laser beam L2 with the top-hat distribution (intensity distribution D0) is input, the intensity distribution changer 130 outputs the third laser beam L3 with the intensity distribution changed to the Gaussian distribution (intensity distribution D3).

More specifically, the optical fiber of the intensity distribution changer 130 is a so-called process fiber or double-core fiber. With the optical fiber, a small diameter spot beam and a large diameter spot beam can be simultaneously emitted on the same axis. The optical fiber includes a first core portion that is arranged in a center portion and has a fiber shape and a second core portion that has a cylindrical form to cover the first core portion having the fiber shape. The optical fiber further includes a first clad portion between the first core portion and the second core portion, a second clad portion that is a peripheral surface of the second core portion, and an armor made of resin or the like that covers a peripheral surface of the second clad portion. The first core portion generates the small diameter spot beam, and the second core portion generates the large diameter spot beam.

More specifically, the intensity distribution changer 130 inputs the second laser beam L2, as excitation light and signal light, to the first core portion and the second core portion, and thus excites the first core portion to which the excitation light is input, and outputs the oscillated laser beam from the first core portion in accordance with the signal light. The second laser beam L2 that has been input is changed to the third laser beam L3 by the intensity distribution changer 130 to be output.

In the second embodiment, the intensity distribution changer 130 changes the top-hat distribution (intensity distribution D0) of the second laser beam L2 that is input, and outputs the resultant third laser beam L3 with the intensity distribution changed to the Gaussian distribution (intensity distribution D3) with a distribution range (spot) corresponding to the diameter of the first core portion. As described above, the intensity distribution changer 130 changes the intensity distribution of the second laser beam L2 that has been input, and thus outputs the resultant third laser beam L3.

The total reflection mirror 140 reflects the input laser beam with a small amount of loss. The total reflection mirror 140 changes the traveling direction of the third laser beam L3, and thus changes the traveling direction of the third laser beam L3 that is input to a direction toward the collimator lens 181.

Thus, the first laser beam L1 and the third laser beam L3 are output from the laser generation unit 100 to the laser beam output unit 200.

The laser beam output unit 200 is the so-called laser process torch that outputs the emitted laser beam Ltg for the welding processing so as to be emitted onto the joining subject portion. To the laser beam output unit 200, the first laser beam L1, transmitted from the laser generation unit 100 through the first optical fiber 190, is input as a fourth laser beam L4, and the third laser beam L3, transmitted through the second optical fiber 191, is input as a fifth laser beam L5. The laser beam output unit 200 outputs the emitted laser beam Ltg based on a combined laser beam L6 obtained by combining the fourth and the fifth laser beams L4 and L5.

The laser beam output unit 200 includes a total reflection mirror 220, which changes a traveling direction of the fifth laser beam L5 input thereto, and a combiner 210, which combines the fourth laser beam L4 input thereto and the fifth laser beam L5 with the changed traveling direction and thus outputs the resultant combined laser beam L6. The laser beam output unit 200 includes a condensing lens 250 that irradiates the joining subject portion with the combined laser beam L6 in a condensing manner.

The combiner 210, which is known as a dichroic mirror, generates the combined laser beam L6 by combining the fourth laser beam L4 and the fifth laser beam L5 that are made incident thereon. More specifically, the combiner 210 includes a reflection unit 211 that transmits the fourth laser beam L4 and reflects the fifth laser beam L5. With the combiner 210, the optical axis of the fourth laser beam L4 that has transmitted through the reflection unit 211 and the optical axis of the fifth laser beam L5 that has been reflected by the reflection unit 211 match on the same axis, whereby the combined laser beam L6 as a result of combining the fourth laser beam L4 and the fifth laser beam L5.

The combined laser beam L6 has an intensity distribution D6 obtained by combining the intensity distribution D1 of the first laser beam L1 obtained by the splitting with the intensity distribution D3 of the third laser beam L3 obtained by the changing by the intensity distribution changer 130. Thus, the combined intensity distribution D6 is a combination of the top-hat distribution (intensity distribution D1) of the first laser beam L1 and the Gaussian distribution (intensity distribution D3) of the third laser beam L3 with the distribution range more focused compared with the top-hat distribution. Thus, the intensity distribution D6 is obtained by the combining in which the intensity distribution D3 as the Gaussian distribution is added to the center of the distribution range of the top-hat distribution (intensity distribution D1) serving as the basis.

In the combiner 210, the position of the axis of the transmitted or reflected laser beam is changed in accordance with an input position of the laser beam, and thus the combination between the distribution D1 of the fourth laser beam L4 and the intensity distribution D3 of the fifth laser beam L5 can be varied by adjusting the input positions of the fourth laser beam L4 and the fifth laser beam L5. Thus, the intensity distribution may be generated by changing the position where the Gaussian distribution is added to a position other than the center portion of the top-hat distribution range.

The condensing lens 250 is a lens that outputs the input laser beam to a predetermined position in a condensed manner, and thus outputs the emitted laser beam Ltg obtained by adjusting the input combined laser beam L6 to be condensed. In other words, the condensing lens 250 condenses the combined laser beam L6 to a smaller range with the intensity distribution maintained, so that the energy intensity P in the irradiation range of the emitted laser beam Ltg is increased. Thus, the joining subject portion is irradiated with the emitted laser beam Ltg with high energy intensity to have the temperature risen to be molten in a favorable manner. For example, when a plurality of metallic members are the joining subjects, the members can be molten to be welded.

The laser welding device of the second embodiment irradiates the joining subject portion with the emitted laser beam Ltg obtained by focusing the combined laser beam L6 having the intensity distribution as a combination of the top-hat and the Gaussian intensity distributions with the distribution maintained.

With the top-hat distribution, the energy intensity P in the surface irradiated with the laser beam is balanced within the distributed range of (the range irradiated with) the laser beam, whereby the difference between two positions in the range in the energy intensity P is small. Thus, in the range irradiated with the top-hat distribution laser beam, the energy of the laser beam is evenly applied over the range. Thus, the amounts of heat distributed over the range irradiated with the laser beam are averaged, whereby the entire irradiated range is evenly heated and molten. The welding processing is stably performed on the joining subject portion under a melting condition corresponding to the even melting. The intensity distribution includes no portion where the energy intensity P is high, and thus the energy is prevented from being intensively applied to a particular portion, the melting processing is less likely to be too intense to cause excessive heating or to penetrate through the part. As described above, with the top-hat distribution, a stable welding processing can be achieved and the welding can be stably controlled easily. However, because the intensity distribution is averaged, that is, the energy of the laser beam is evenly distributed in the irradiated range, a long period of time is required for heating and melting the member, and processing is difficult to reach a deep point in a member.

On the other hand, the Gaussian distribution includes a portion where the energy intensity P is high obtained by focusing the energy of the laser beam to a small range in the center portion of the range irradiated with the laser beam, and thus the small range is intensively heated and molten.

With the laser beam, the joining subject portion is welded under the melting condition corresponding to the intensive melting, and thus welding processing can be quickly performed. The Gaussian distribution can achieve a melting condition in which the melting processing can reach a deep point by generating the so-called keyhole as a recess formed by evaporating a material at a portion where the energy intensity P is high to cause the convection of the molten body and the like. More specifically, with the portion where the energy intensity P is high, the heating and the melting can be surely performed with a short period of time, and thus the welding is facilitated, and the melting processing can reach a deep point of the member. However, because there is the portion where the intensity P of the energy is high, highly accurate control is required because of high processing sensitivity such as possible quick change in a welding state, low robust stability, risk of overheating or penetration due to a slightest excess of the irradiation time, high accuracy required for the laser beam irradiated position, and the like.

As described above, the emitted laser beam Ltg is concentrated to a smaller irradiated range to have a higher energy intensity P, and has an intensity distribution with a shape that is the same as that of the intensity distribution D6 of the combined laser beam L6. With the emitted laser beam Ltg, having the intensity distribution that has the same shape as the intensity distribution D6, the energy applied to the irradiation range corresponding to the Gaussian distribution is averaged. Thus, the welding processing can be stably performed and can be easily controlled. The welding processing is expected to be ensured by high energy at the center portion of the irradiated range corresponding to the Gaussian distribution.

More specifically, the emitted laser beam Ltg evenly heats and melts the entire irradiated range with the top-hat distribution and facilitates the heating and melting at the center portion of the Gaussian distribution of the beam emitted on the center portion of the top-hat distribution. Thus, the energy intensity in the Gaussian distribution can be lowered, whereby the welding processing can be more stably performed with a weaker laser beam with the Gaussian distribution. With the emitted laser beam Ltg, the temperature rise and the melting can be quickly achieved at the center portion with the Gaussian distribution, and the welding processing can be more quickly performed with the top-hat distribution with the temperature rise and the melting at the center portion quickly transmitted to the portion corresponding to the top-hat distribution. Thus, with the emitted laser beam Ltg as a combination of the top-hat and the Gaussian distributions, the welding processing can be performed with high stability achieved with the top-hat distribution and a high speed achieved with the Gaussian distribution. With the variable ratio between the top-hat and the Gaussian distributions to be combined, an intensity distribution (profile) suitable for the joining subject portion can be generated.

Generally, the laser oscillator, which oscillates the laser beam, imposes restrictions on the intensity distribution of the laser beam. Thus, the state of the intensity distribution cannot be easily adjusted. However, in the second embodiment, the oscillated laser beam L0, which is emitted from the laser oscillator 110, is split, and the intensity distribution of the second laser beam L2, as one of the laser beams obtained by the splitting, is changed to generate the third laser beam L3. Then, the first and the third laser beams L1 and L3 obtained by the splitting are combined. Thus, the intensity distribution of the laser beam can be easily adjusted. Accordingly, the laser welding device of the second embodiment sets the intensity distribution of the laser beam emitted to the joining subject portion in a further desirable manner.

The operation of the second embodiment will now be described.

First of all, an appropriate intensity distribution corresponding to the state of the joining subject portion is determined. When the appropriate intensity distribution is determined, the splitting ratio of the splitter 120 is specified so that the intensity distribution of the combined laser beam L6 matches the determined intensity distribution. The control unit 121 of the splitter 120 controls the splitting ratio of the splitter unit 122 based on the specified splitting ratio. For example, the splitter 120 controls the splitting ratio of the splitter unit 122 in accordance with the splitting ratio set by a setter in or out of the splitter 120. Thus, the oscillated laser beam L0 is input to the splitter unit 122 the splitting ratio of which is appropriately controlled, to be transmitted or reflected with an appropriate splitting ratio to be divided into the first and the second laser beams L1 and L2. Then, the combined laser beam L6 having the intensity distributions generated in accordance with the first and the second laser beams L1 and L2 obtained by the dividing is generated.

Thus, the intensity distribution of the laser beam emitted on the joining subject portion can be more appropriately set.

As described above, with the laser welding device and the laser welding method of the second embodiment, the effects listed below can be obtained.

(1) The oscillated laser beam L0, oscillated by the laser oscillator 110 is split, and the second laser beam L2 as one of the resultant light beams is changed by the intensity distribution changer 130, and then the resultant laser beam is combined with the first laser beam L1 as the other one of the laser beams. Thus, the intensity distribution, that is, the so-called profile of the emitted laser beam Ltg emitted on the joining subject portion can be changed without changing the characteristics of the laser oscillator 110. Thus, the second laser beam L2 as one of the light beams obtained by the splitting is adjusted, but the first laser beam L1 is used as it is, whereby the intensity distribution of the emitted laser beam Ltg emitted on the joining subject portion can be relatively easily changed. Thus, the emitted laser beam Ltg emitted on the joining subject portion can be changed to have the intensity distribution suitable for the welding.

The intensity distribution (ratio between the Gaussian intensity distribution and the top-hat intensity distribution) of the combined laser beam L6 emitted on the joining subject portion can be controlled with a relatively simple method of controlling the laser beam splitting ratio of the splitter unit 122.

(2) The intensity distributions of the laser beam include the Gaussian distribution and the top-hat distribution that are based on the intensity distribution of the laser beam in the irradiated range, and differ from each other in the characteristics related to the welding. Thus, with the third laser beam L3 output from the intensity distribution changer 130 having an intensity distribution different from that of the first laser beam L1, the characteristics related to the welding of the combined laser beam L6 are adjusted.

(3) The splitter 120, which is the so-called beam splitter, splits the oscillated laser beam L0 in two and thus can be have a simple configuration.

Third Embodiment

A third embodiment of the laser welding device will now be described with reference to FIG. 10. The laser welding device of the third embodiment can be applied to the laser welding device of the first embodiment, or may be used independently from the first embodiment.

The third embodiment is only different from the configuration of the laser welding device of the second embodiment in that the laser beam output unit 200 includes the intensity distribution changer 130. The common configurations are denoted with the same reference numerals and a detail description thereof will be omitted.

Figure 10:
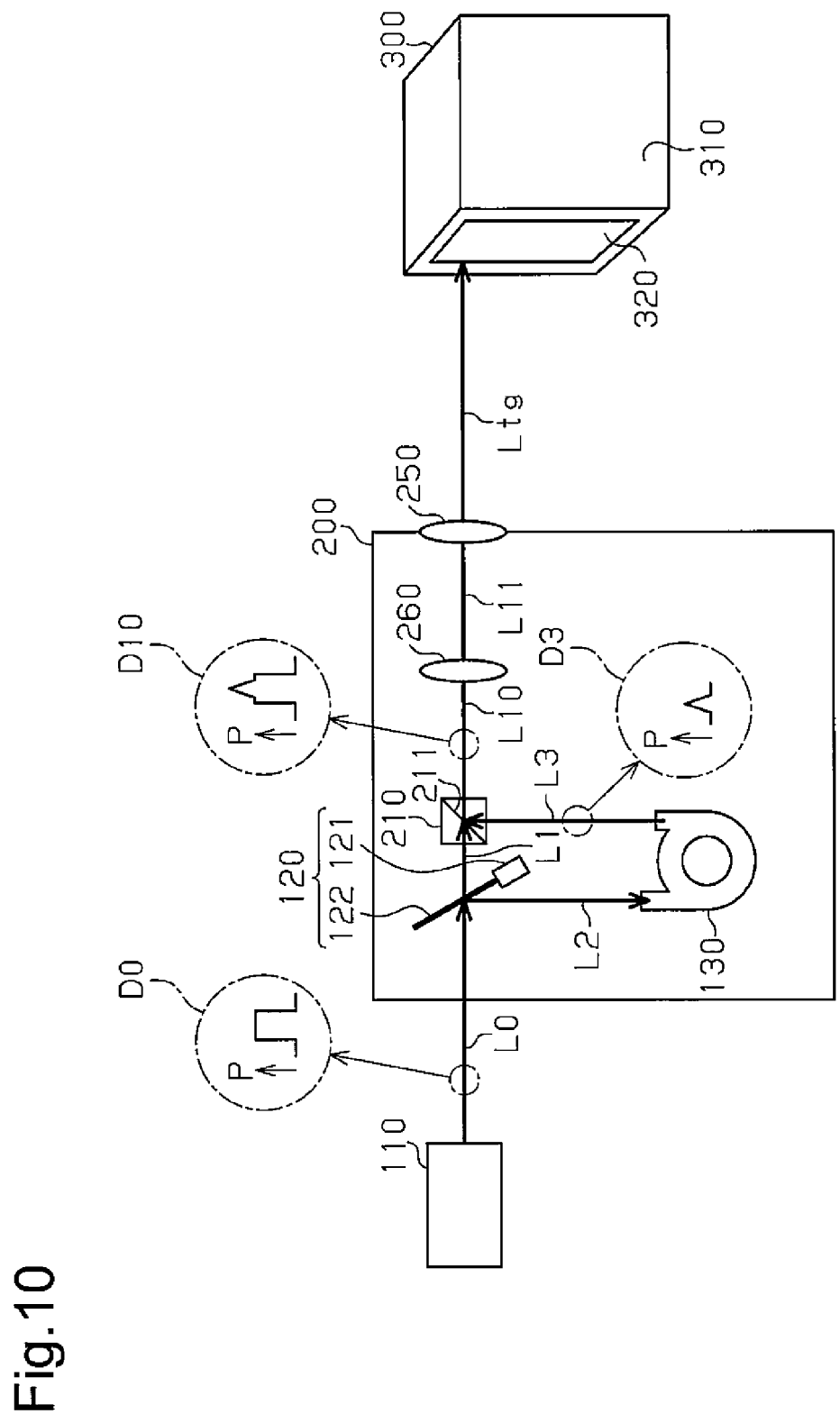
FIG. 10 is a schematic diagram illustrating the configuration of a third embodiment of the laser welding device.

As illustrated in FIG. 10, the laser beam output unit 200 receives the oscillated laser beam L0, oscillated by the laser oscillator 110, and outputs the emitted laser beam Ltg to be emitted on the joining subject portion of the battery 300 as the joining subject. The battery 300 includes the casing 310 made of metal and the lid 320 made of metal. The joining subject portion, formed by combining the casing 310 to the lid 320, is welded by the emitted laser beam Ltg emitted from the laser beam output unit 200.

The laser beam output unit 200 includes the splitter 120, the intensity distribution changer 130, the combiner 210, a collimator lens 260, and the condensing lens 250. The collimator lens 260 collimates incident combined laser beam L10 into parallel light, and is substantially the same as the collimator lenses 180 and 181 of the second embodiment.

The laser beam output unit 200 uses the splitter 120 to split the received oscillated laser beam L0, oscillated by the laser oscillator 110, into the first laser beam L1 and the second laser beam L2. Here, the splitting ratio of the splitter 120 is adjusted in such a manner that the combined laser beam L10 with a predetermined intensity distribution D10 is obtained. The second laser beam L2 is output as the third laser beam L3 with the intensity distribution changed by the intensity distribution changer 130. The first laser beam L1 and the third laser beam L3 are made incident on the combiner 210, to be output as the combined laser beam L10 with the combined intensity distribution D10. In other words, the intensity distribution D10 of the combined laser beam L10 is a distribution as a combination of the intensity distribution of the first laser beam L1 and an intensity distribution D0 of the third laser beam L3. The combined laser beam L10 is collimated by the collimator lens 260 into the parallel light L11, and the joining subject portion of the battery 300 is irradiated with the emitted laser beam Ltg output from the condensing lens 250 to which the parallel light L11 has been input.

It is well known that the first core portion that oscillates the laser beam in the intensity distribution changer 130 emits heat, but the heat is not emitted by the first core portion in a large amount and easily propagates to the second core portion, the second clad portion, and the like through the first clad portion. Thus, cooling can be achieved without largely changing the cooling capability that has been conventionally provided to the laser beam output unit 200. The intensity distribution changer 130, which has a small size and can be maintained with no cumbersome procedure, can be easily installed in the laser beam output unit 200.

As described above, with the laser welding device and the laser welding method of the third embodiment, the effect listed below can be obtained, in addition to the effects (1) to (3) described in the second embodiment.

(4) The intensity distribution changer 130 is small and emits a small amount of heat, and thus can be easily installed in the laser beam output unit 200.

Fourth Embodiment

A fourth embodiment of the laser welding device will now be described with reference to FIGS. 11 to 14. The laser welding device of the fourth embodiment can be applied to the laser welding device of the first embodiment, or may be used independently from the first embodiment.

The fourth embodiment is only different from the configuration of the laser welding device of the third embodiment in that a configuration of determining the splitting ratio in accordance with the distance between the casing 310 and the lid 320, which are joining subject portions, is added. The common configurations are denoted with the same reference numerals and a detail description thereof will be omitted.

Figure 11:
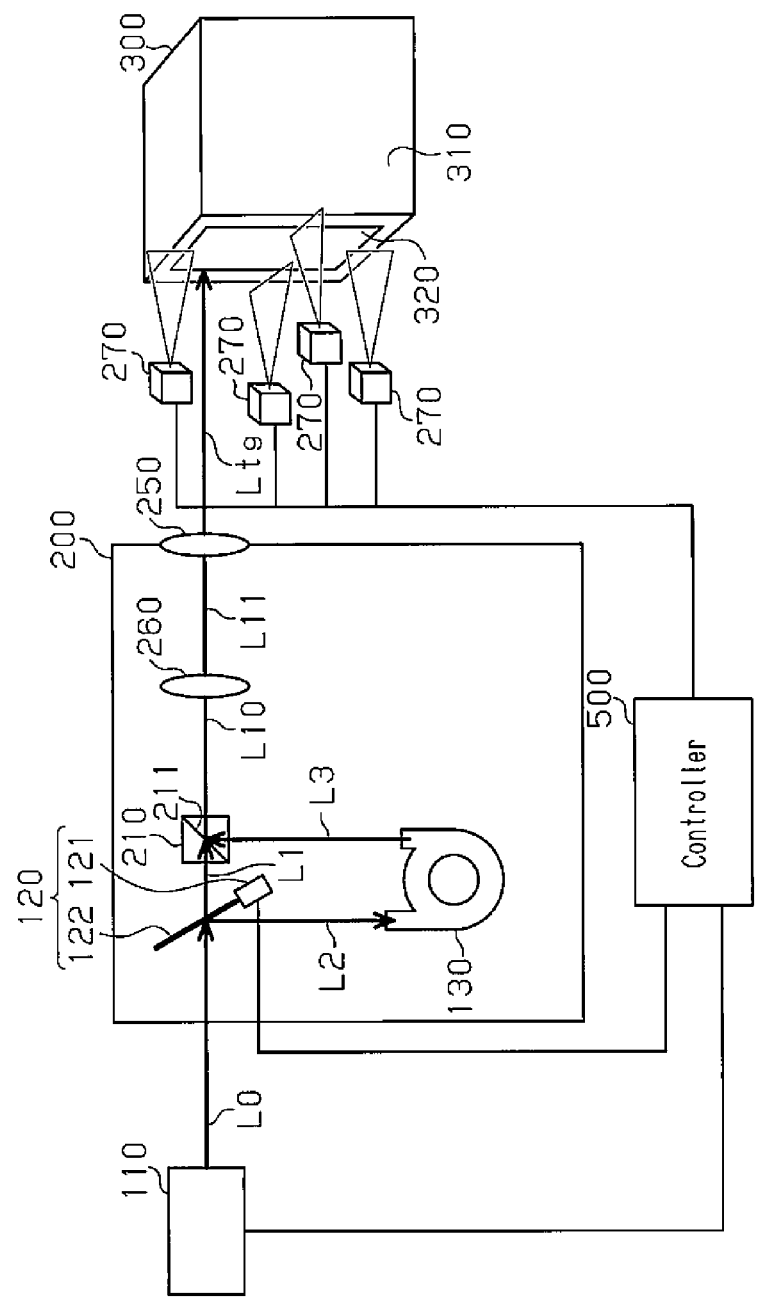
FIG. 11 is a schematic diagram illustrating the configuration of a fourth embodiment of the laser welding device.

As illustrated in FIG. 11, the laser welding device includes four detectors 270 as detection units that detects a distance between the two joining subject members that are the casing 310 and the lid 320 of the battery 300, that is, the groove width W of the groove portion 330 (see FIG. 12) formed by the casing 310 and the lid 320.

Figure 12:
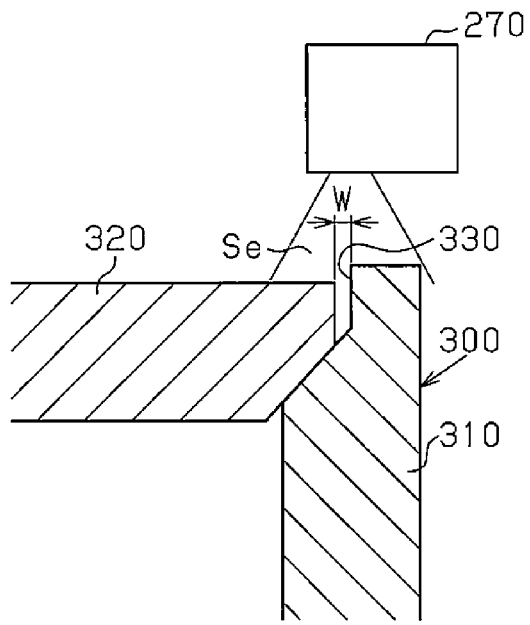
FIG. 12 is a schematic view illustrating the measurement of the distance between a casing and a lid in the laser welding device illustrated in FIG. 11.

More specifically, as illustrated in FIG. 12, each of the detectors 270 detects the groove width W of the groove portion 330 between the casing 310 and the lid 320 through laser measurement using measurement laser Se. For example, the detector 270 moves the measurement laser Se across the groove portion 330 (scanning) to measure the distance between the detector 270 and the joining subject portions, and recognizes a portion between the casing 310 and the lid 320 where a long measurement result is obtained as the groove width W of the groove portion 330. The detector 270 may recognize the groove portion 330 and the groove width W thereof through image recognition. The detector 270 outputs the groove width W of the groove portion 330 thus detected to the controller 500.

The controller 500 adjusts the intensity distribution of the combined laser beam L10 in accordance with the groove width W of the groove portion 330. The controller 500 is connected to the laser oscillator 110, the splitter 120, and the detectors 270, and receives the detected groove width W of the groove portion 330 from the detectors 270. The controller 500 controls the splitting ratio of the splitter 120. More specifically, the splitter 120 adjusts the splitting ratio of the splitter unit 122 through the control unit 121 in accordance with a control signal from the controller 500.

Figure 13:
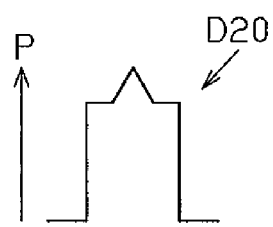
FIG. 13 is a schematic view illustrating one mode of combined laser beams in the laser welding device illustrated in FIG. 11.

The controller 500 controls the splitting ratio in such a manner that the combined laser beam L10 has an intensity distribution D20 in which the ratio of the top-hat distribution is higher than that of the Gaussian distribution when the groove width W of the groove portion 330 is large as illustrated in FIG. 13. This is because the large groove width W provides the same effect as the keyhole generated in the weld pool by the laser beam with the Gaussian distribution, and thus the emitted laser beam Ltg needs not to generate the keyhole. Thus, with the intensity distribution D20, the welding processing can be stably and quickly performed on the joining subject portions with the large groove width W.

Figure 14:
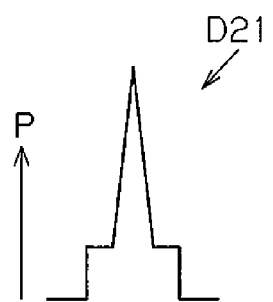
FIG. 14 is a schematic view illustrating another mode of combined laser beams in the laser welding device illustrated in FIG. 11.

When the groove width W of the groove portion 330 is small as illustrated in FIG. 14, the controller 500 controls the splitting ratio in such a manner that the combined laser beam L10 has an intensity distribution D21 in which the rate of the Gaussian distribution is higher than that of the top-hat distribution. Thus, the keyhole is generated by the emitted laser beam Ltg with the Gaussian distribution in the weld pool generated in the portion where the groove width W is small, whereby the welding processing can be quickly performed and reach a deep position.

The splitting ratio can be determined by a measurement before the laser welding starts, when the groove width W of the groove portion 330 in the welded range is substantially constant. When the groove width W of the groove portion 330 changes due to a movement of the joining subject portion (for example, the first exemplary embodiment and the modification thereof), the groove width W of the joining subject portion may be measured thereafter, and the feedback control can be performed on the splitting ratio based on the measured groove width W. The controller 500 may control an output intensity of the oscillated laser beam L0 from the laser oscillator 110. In this case, the output intensity of the laser oscillator 110 is variable in accordance with a control signal from the controller 500. Thus, the controller 500 can more appropriately perform the welding control with the control signal from the controller 500.

As described above, with the laser welding device and the laser welding method of the fourth embodiment, the effects listed below can be obtained, in addition to the effects (1) to (4) described in the second and the third embodiments.

(5) The inventors have found out through studies that the welding state changes in accordance with the groove width W of the groove portion 330 of the joining subject portion. Thus, by controlling the splitting ratio of the oscillated laser beam L0 to achieve an appropriate splitting ratio in accordance with the groove width W of the groove portion 330, the intensity distribution of the emitted laser beam Ltg emitted on the joining subject portion is favorably changed to achieve more accurate laser welding.

(6) The groove width W of the groove portion 330 may vary in accordance with tolerance, individual differences, and the like. Thus, by changing the splitting ratio of the oscillated laser beam L0 in accordance with the distance detected by the detectors 270, more appropriate welding is maintained, whereby the accuracy of the welding by the emitted laser beam Ltg is likely to increase.

Fifth Embodiment

A fifth embodiment of the laser welding device will now be described with reference to FIGS. 15 to 18. The laser welding device of the fifth embodiment can be applied to the laser welding device of the first embodiment, or may be used independently from the first embodiment.

The fifth embodiment is only different from the configuration of the laser welding device of the fourth embodiment in that the splitting ratio of the splitter 120 is determined in accordance with the melting state of the joining subject portion. The common configurations are denoted with the same reference numerals and a detail description thereof will be omitted.

Figure 15:
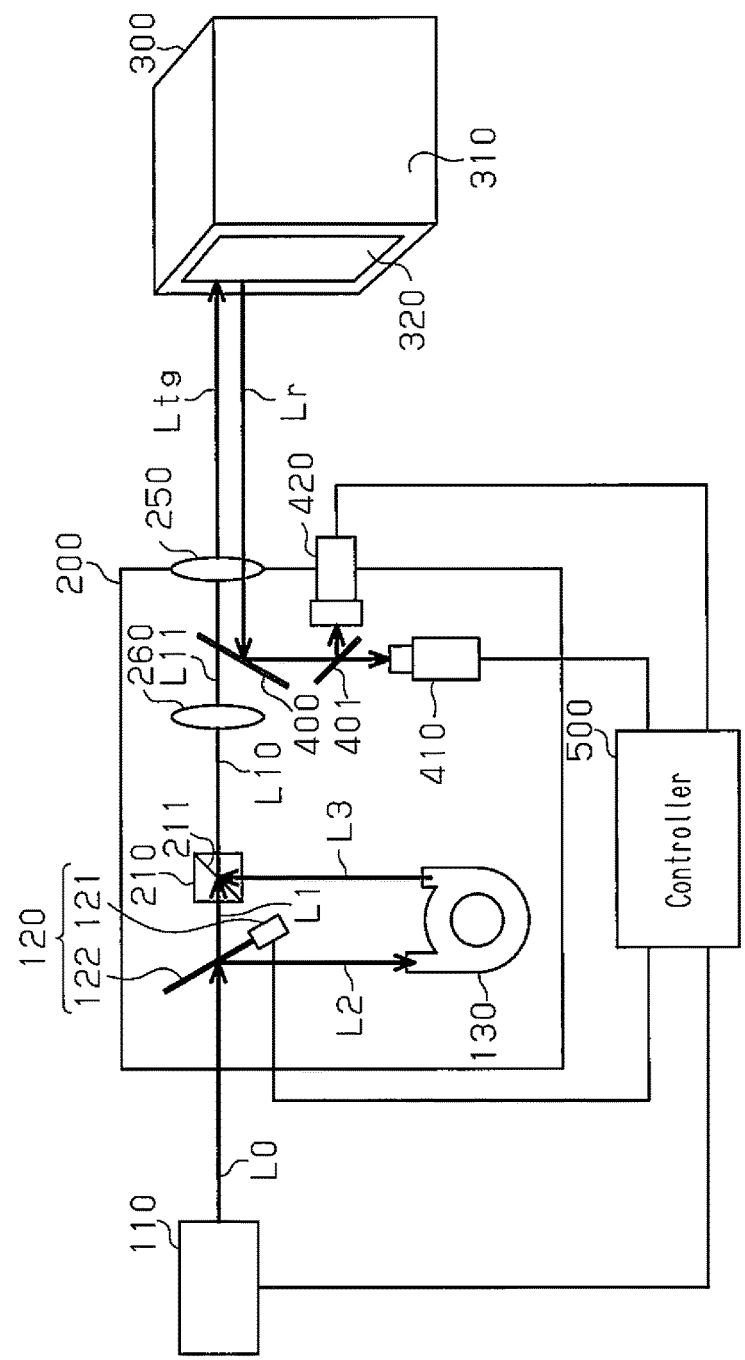
FIG. 15 is a schematic diagram illustrating the configuration of a fifth embodiment of the laser welding device.

As illustrated in FIG. 15, the laser beam output unit 200 measures reflected light Lr, indicating the melting state of the joining subject portion irradiated with the emitted laser beam Ltg, with an image recognition device 410 and an intensity measurement device 420 forming a melting state measurement device. The laser beam output unit 200 inputs the reflected light Lr to the image recognition device 410 and the intensity measurement device 420 through the condensing lens 250 and first and second spectroscopes 400 and 401.

Figure 16:
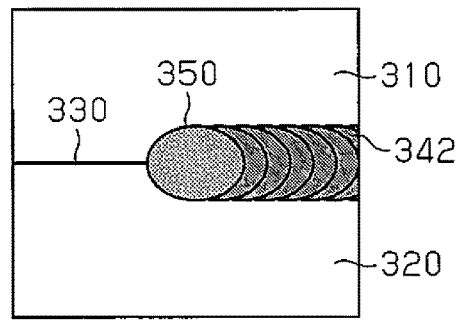
FIG. 16 is a schematic view illustrating a state of a welded portion during welding in the laser welding device illustrated in FIG. 15.
Figure 17:
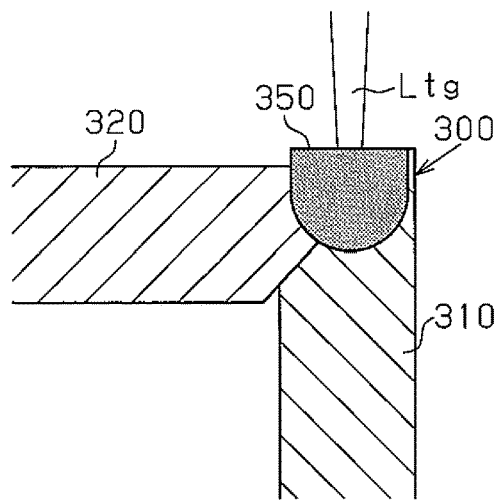
FIG. 17 is a schematic view illustrating a melting state of the welded portion in the laser welding device illustrated in FIG. 15.

As illustrated in FIGS. 16 and 17, the laser beam output unit 200 inputs the reflected light Lr indicating the state of the weld pool 350 in the groove portion 330, between the casing 310 and the lid 320, irradiated with the emitted laser beam Ltg. For example, the energy such as irradiation light and heat is high at the weld pool 350 where the joining subject member (for example, metal) is molten, but is low at a bead 342 where the welding has been completed, and thus has a low temperature and has been hardened.

As illustrated in FIG. 15, the first spectroscope 400 allows the parallel light L11 to pass therethrough, and reflects the reflected light Lr made incident in a direction opposite to the traveling direction of the parallel light L11.

With the second spectroscope 401, light input to the image recognition device 410 and light input to the intensity measurement device 420 are separated from each other in accordance with the wavelengths of light. Light with a wavelength range including a wavelength of 1000 nm and light with a wavelength range including wavelengths 400 to 500 nm are separated from each other by respectively being transmitted through and reflected by the second spectroscope 401. The second spectroscope 401 causes the transmitted light with the wavelength range including a wavelength of 1000 nm to be input to the image recognition device 410, and causes the light with a wavelength range including wavelengths 400 to 500 nm to be input to the intensity measurement device 420.

The image recognition device 410 includes a camera, for example, a CCD camera that captures an image of the weld pool 350. The image recognition device 410 is an image recognition device that captures an image of the light with the wavelength range including a wavelength of 1000 nm, and thus detects the size of the weld pool 350. The wavelength range including a wavelength of 1000 nm is a range with which the light generated by the joining subject portion during the welding can be favorably measured. The weld pool 350 is in a liquid form, and the size thereof can be detected due to the surface state different from a solid portion such as the casing 310, the lid 320, or the bead 342. The size of the weld pool 350 may be detected based on the luminance or the temperature that can be detected from the other light. The image recognition device 410 outputs the size of the weld pool 350 thus detected to the controller 500.

The intensity measurement device 420 includes a sensor, for example, an infrared sensor that measures the intensity of infrared rays from the weld pool 350. The intensity measurement device 420 is a device that measures the emitted light intensity of the light with the wavelength range including wavelengths 400 to 500 nm, and can, for example, favorably measure light emitted when the molten metal is evaporated (plasma gasification). For example, the evaporating temperature of a material including aluminum as metal is about 2300 to 2500° C. The intensity measurement device 420 outputs the emitted light intensity thus detected to the controller 500.

The controller 500 is connected to the laser oscillator 110, the splitter 120, the image recognition device 410, and the intensity measurement device 420.

The controller 500 controls at least one of the laser oscillator 110 and the splitter 120 in accordance with the size and the emitted light intensity of the weld pool 350, so that the intensity distribution of the combined laser beam L10 is adjusted.

First of all, how the controller 500 controls the intensity distribution in accordance with the size of the weld pool 350 is described. The controller 500 adjusts the energy intensity in the top-hat distribution as one of the intensity distributions of the emitted laser beam Ltg in accordance with the size of the weld pool 350. This is because the top-hat distribution with which the energy is applied to the entire range is highly influential due to the correlation between the size of the weld pool 350 and the amount of energy applied to the entire range irradiated with the emitted laser beam Ltg.

The controller 500 can determine whether the size of the weld pool 350 is larger than the size suitable for the welding. Upon determining that the size of the weld pool 350 is larger, the controller 500 performs a control in such a manner that the energy intensity in the top-hat distribution in the emitted laser beam Ltg is reduced. On the other hand, upon determining that the size of the weld pool 350 is smaller, the controller 500 performs a control in such a manner that the energy intensity in the top-hat distribution in the emitted laser beam Ltg is increased. Here, the controller 500 controls the energy intensity of the top-hat distribution of the emitted laser beam Ltg by controlling the energy intensity of the first laser beam L1.

In the fifth embodiment, the energy intensity of the first laser beam L1 can be controlled by adjusting the laser beam output from the laser oscillator 110 and/or adjusting the splitting ratio of the splitter 120.

More specifically, the controller 500 can increase (or reduce) the energy intensity of the first laser beam L1 by increasing (or reducing) the output of the laser oscillator 110. Here, the intensity of the second laser beam L2 as the other one of the light beams obtained by the splitting is also increased (or reduced). Thus, the energy intensity of the top-hat distribution and the Gaussian distribution in the combined laser beam L10 are both similarly increased (or reduced).

The controller 500 changes the splitting ratio of the splitter 120 to increase (or reduce) the transmittance, and thus can increase (or reduce) the energy intensity of the first laser beam L1. Here, the reflectance changes in the opposite way with respect to the transmittance to be reduced (or increased), and thus the energy intensity of the second laser beam L2 is reduced (or increased). Thus, the energy intensity of the top-hat distribution in the combined laser beam L10 is increased (or reduced), whereas the energy intensity of the Gaussian distribution is reduced (or increased).

Next, how the controller 500 controls the intensity distribution in accordance with the emitted light intensity of the weld pool 350 will be described. The controller 500 adjusts the energy intensity in the Gaussian distribution as one of the intensity distributions of the emitted laser beam Ltg in accordance with the emitted light intensity of the weld pool 350. This is because the Gaussian distribution, including a portion where the maximum energy is applied in the emitted laser beam Ltg, is highly influential because the emitted light intensity of the weld pool 350 is likely to be high at an intensively melting portion.

The controller 500 can determine whether the emitted light intensity of the weld pool 350 is higher than an emitted light intensity in an appropriate melting state. Upon determining that the emitted light intensity of the weld pool 350 is higher, the controller 500 performs a control in such a manner that the energy intensity in the Gaussian distribution in the emitted laser beam Ltg is reduced. On the other hand, upon determining that the emitted light intensity of the weld pool 350 is lower, the controller 500 performs a control in such a manner that the energy intensity in the Gaussian distribution in the emitted laser beam Ltg is increased. Here, the controller 500 controls the energy intensity in the Gaussian distribution in the emitted laser beam Ltg by controlling the energy intensity of the second laser beam L2.

In the fifth embodiment, the energy intensity in the second laser beam L2 can be controlled by adjusting the laser beam output from the laser oscillator 110 and/or adjusting the splitting ratio of the splitter 120

More specifically, the controller 500 can increase (or reduce) the energy intensity of the second laser beam L2 by increasing (or reducing) the output of the laser oscillator 110. Here, the intensity of the first laser beam L1 as the other one of the light beams obtained by the splitting is also increased (or reduced). Thus, the energy intensity of the top-hat distribution and the Gaussian distribution in the combined laser beam L10 are both similarly increased (or reduced).

The controller 500 changes the splitting ratio of the splitter 120 to increase (or reduce) the reflectance, and thus can increase (or reduce) the energy intensity of the first laser beam L1. Here, the transmittance changes in the opposite way with respect to the reflectance to be reduced (or increased), and thus the energy intensity of the first laser beam L1 is reduced (or increased). Thus, the energy intensity of the Gaussian distribution in the combined laser beam L10 is increased (or reduced), whereas the energy intensity of the top-hat distribution is reduced (or increased).

Figure 18:
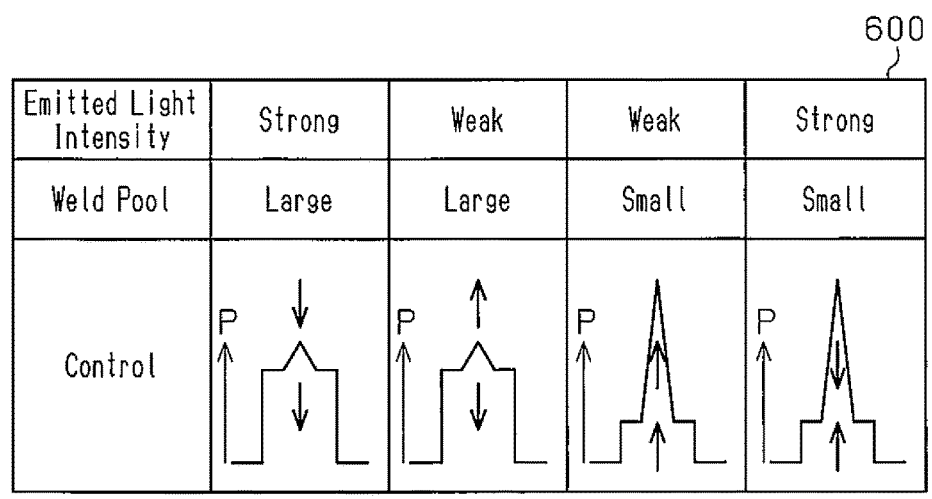
FIG. 18 is a list schematically illustrating the corresponding relationship between the melting state and the combined laser beam in the laser welding device illustrated in FIG. 15.

With reference to a list 600 in FIG. 18, examples are described where the controller 500 adjusts the intensity distribution of the combined laser beam L10 in accordance with the size and the emitted light intensity of the weld pool 350.

The controller 500 determines that the energy intensity emitted onto the entire joining subject portion is high when the emitted light intensity is "high" and the weld pool is "large," and performs a control in such a manner that the energy intensities in both the top-hat distribution and the Gaussian distribution are reduced. For example, the controller 500 reduces the output from the laser oscillator 110.

The controller 500 determines that the energy intensity emitted onto the entire joining subject portion is high but the energy intensity emitted onto the center portion of the joining subject portion is low when the when the emitted light intensity is "low" and the weld pool is "large." Then, the controller 500 performs a control in such a manner that the energy intensity in the Gaussian distribution is increased, but the energy intensity in the top-hat distribution is reduced. For example, the controller 500 controls the splitting ratio of the splitter 120 in such a manner that the transmittance is reduced.

The controller 500 determines that the energy intensity emitted onto the joining subject portion is low when the emitted light intensity is "low" and the weld pool is "small," and performs a control in such a manner that the energy intensities in both the top-hat distribution and the Gaussian distribution are increased. For example, the controller 500 increases the output of the laser oscillator 110.

The controller 500 determines that the energy intensity emitted onto the entire joining subject portion is low but the energy intensity emitted onto the center portion of the joining subject portion is high, when the emitted light intensity is "high" and the weld pool is "small." Then, the controller 500 performs a control in such a manner that the energy intensity in the Gaussian distribution is reduced, but the energy intensity in the top-hat distribution is increased. For example, the controller 500 controls the splitting ratio of the splitter 120 in such a manner that the transmittance is increased.

Thus, the laser welding device generates the combined laser beam L10 with an intensity distribution suitable for the welding in accordance with emitted light intensity and the size of the weld pool 350 in the joining subject portion, and can emit the combined laser beam L10 as the emitted laser beam Ltg to the joining subject portion. Thus, the welding processing can be executed while maintaining a favorable welting state of the joining subject portion.

As described above, with the laser welding device and the laser welding method of the fifth embodiment, the effect listed below can be obtained, in addition to the effects (1) to (4) described in the second and the third embodiment.

(7) The splitting ratio of the oscillated laser beam L0 is controlled in accordance with the melting state of the joining subject portion, that is, the feedback control is performed, whereby the an appropriate welding at the joining subject portion is more likely to be maintained. For example, the infrared intensity of the weld pool 350 changes in accordance with the melting state, and thus the intensity distribution of the emitted laser beam Ltg can be controlled to achieve characteristics suitable for the welding by measuring the infrared intensity. For example, the infrared intensity of the weld pool 350 changes in accordance with the welding state, and thus by measuring the infrared intensity, the intensity distribution of the emitted laser beam Ltg can be controlled to achieve the characteristics suitable for the welding.

Sixth Embodiment

A sixth embodiment of the laser welding device will now be described with reference to FIGS. 19 to 21. The laser welding device of the sixth embodiment can be applied to the laser welding device of the first embodiment, or may be used independently from the first embodiment.

The sixth embodiment is only different from the configuration of the laser welding device of the third embodiment in that the output from the intensity distribution changer 130, as the combined laser beam L35, is input to a condensing lens 156. The common configurations are denoted with the same reference numerals and a detail description thereof will be omitted. In FIGS. 19 to 21, the configurations of the optical fiber in the intensity distribution changer 130 are only illustrated for the sake of description and other configurations thereof are omitted in the figures. In the intensity distribution changer 130, a first clad portion 133 is arranged between a first core portion 131 and a second core portion 132 and a second clad portion 134 is arranged on a peripheral surface of the second core portion 132.

Figure 19:
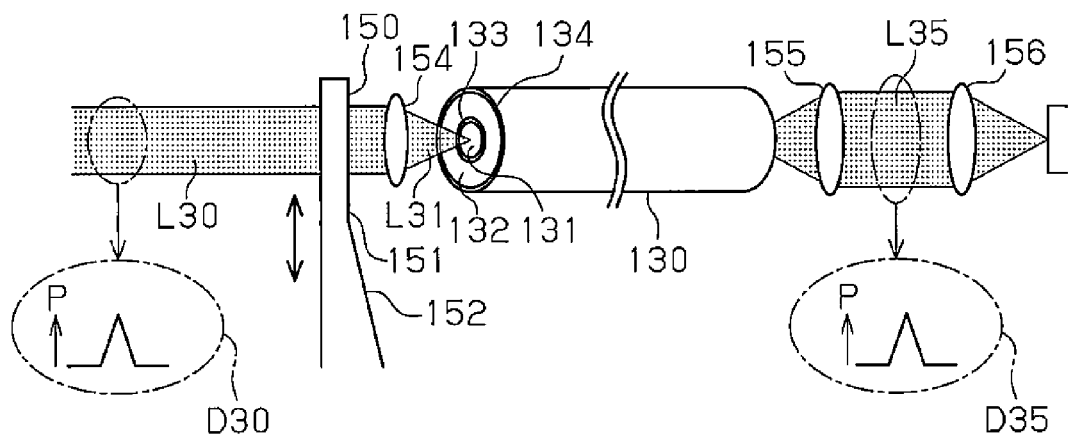
FIG. 19 is an explanatory diagram illustrating the configuration for generating a combined laser beam in a sixth embodiment of the laser welding device.
Figure 20:
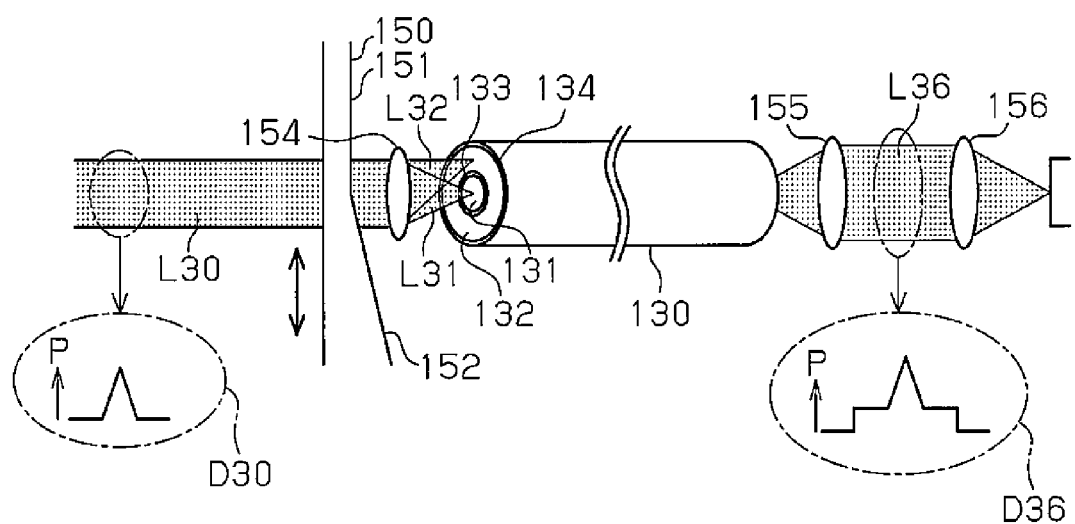
FIG. 20 is an explanatory diagram illustrating one mode of generating the combined laser beams in the laser welding device illustrated in FIG. 19.
Figure 21:
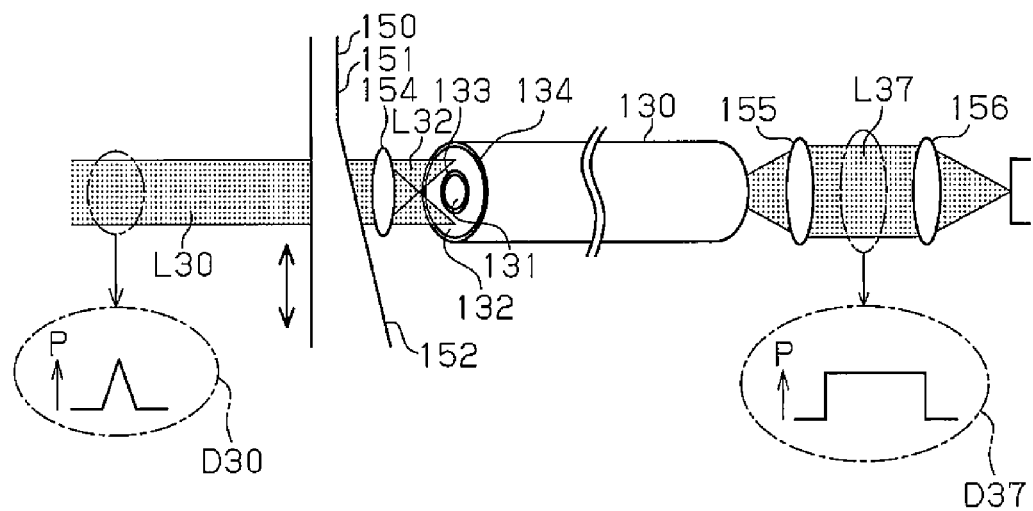
FIG. 21 is an explanatory diagram illustrating another mode of generating the combined laser beams in the laser welding device illustrated in FIG. 19.

As illustrated in FIGS. 19 to 21, in the laser welding device, an oscillated laser beam L30, with a Gaussian distribution (intensity distribution D30), output from the laser oscillation device such as a YAG laser with high luminance is appropriately input to at least one of the first core portion 131 and the second core portion 132 of the intensity distribution changer 130 through a splitter 150. The oscillated laser beam L30 that has passes through the splitter 150 is condensed by the condensing lens 154 arranged between the splitter and the intensity distribution changer 130 to be appropriately input to at least one of the first core portion 131 and the second core portion 132. The intensity distribution changer 130 changes the intensity distribution of the oscillated laser beam L30 thus input, and thus outputs the resultant combined laser beams (combined laser beam L35, L36, and L37). The combined laser beam L36 is obtained by combining the changed laser beam output from the first core portion 131 of the intensity distribution changer 130 with a laser beam as a part of the oscillated laser beam L30 output from the second core portion 132. The combined laser beam L36 and the like output from the intensity distribution changer 130 are temporarily collimated by a collimator lens 155 into parallel light. The resultant parallel light is condensed by the condensing lens 156 to be emitted onto the joining subject portion as a laser beam for the welding processing. The first core portion 131 of the intensity distribution changer 130 changes the intensity distribution of the laser beam to the Gaussian distribution. The second core portion 132 changes the intensity distribution of the laser beam to the top-hat distribution. Thus, even when the oscillated laser beam L30 with the Gaussian distribution is input, the intensity distribution changer 130 outputs the laser beam with the Gaussian distribution from the first core portion 131 and outputs the laser beam with the top-hat distribution from the second core portion 132.

The splitter 150, which is the so-called atypical prism or beam splitter, includes a maintaining surface 151 that maintains the traveling direction of the oscillated laser beam L30 and a refracting surface 152 that changes the traveling direction. The splitter 150 causes a first laser beam L31 which is a part of the oscillated laser beam L30 that transmits through the maintaining surface 151 to be input to the first core portion 131 through a condensing lens 154, and causes a second laser beam L32 that transmits through the refracting surface 152 to be input to the second core portion 132 through the condensing lens 154. Thus, the splitter 150 splits the oscillated laser beam L30 into two laser beams. The splitter 150 is movable in a direction crossing traveling direction of the oscillated laser beam L30, for example, an orthogonal direction (a direction indicated by an arrow in the figure). Thus, the oscillated laser beam L30 may transmit through the maintaining surface 151 only, the maintaining surface 151 and the refracting surface 152, or the refracting surface 152 only. The splitter 150 can change the splitting ratio by changing the ratio between areas of the oscillated laser beam L30 on the maintaining surface 151 and on the refracting surface 152. More specifically, the splitter 150 changes the splitting ratio by moving with respect to the oscillated laser beam L30.

For example, the splitter 150 causes the oscillated laser beam L30 to transmit through the maintaining surface 151 only as illustrated in FIG. 19, so that the first laser beam L31 that has passed through the maintaining surface 151 is input only to the first core portion 131 through the condensing lens 154. The oscillated laser beam L30 does not transmit through the refracting surface 152 and thus is not input to the second core portion 132. Thus, the combined laser beam L35 with the Gaussian distribution (intensity distribution D35), obtained by the changing by the first core portion 131, is output from the output unit of the intensity distribution changer 130.

For example, as illustrated in FIG. 21, the splitter 150 causes the oscillated laser beam L30 to transmit through the maintaining surface 151 and the refracting surface 152, so that the first laser beam L31 that has transmitted through the maintaining surface 151 is input to the first core portion 131 through the condensing lens 154 and the second laser beam L32 that has transmitted through the refracting surface 152 is input to the second core portion 132 through the condensing lens 154. Thus, the combined laser beam L36 with an intensity distribution D36, as a combination of the Gaussian intensity distribution obtained by the changing in the first core portion 131 and the top-hat intensity distribution obtained by conversion through light guiding by the second core portion 132, is output from the output unit of the intensity distribution changer 130.

For example, as illustrated in FIG. 21, the splitter 150 causes the oscillated laser beam L30 to transmit through the refracting surface 152 only, so that the second laser beam L32 that has transmitted through the refracting surface 152 is only input to the second core portion 132 through the condensing lens 154. The oscillated laser beam L30 does not transmit through the maintaining surface 151 and thus is not input to the first core portion 131. Thus, a combined laser beam L37 with the top-hat distribution (intensity distribution D37) obtained by the changing in the second core portion 132, is output from the output unit of the intensity distribution changer 130.

More specifically, the combined laser beam L36, which has the intensity distribution that is the combination of the Gaussian intensity distribution and the top-hat intensity distribution, can be generated by a simple control that only moves the splitter 150. Thus, a laser beam with an intensity distribution suitable for welding the joining subject portion is generated.

As described above, with the laser welding device and the laser welding method of the sixth embodiment, the effects listed below can be obtained in addition to the effects (1), (2), and (4) described in the second and third embodiments.

(8) The intensity distribution changer 130 is a double core fiber, and thus the characteristics of the second laser beam L32 can be further changed. Thus, the intensity distribution of the combined laser beam L36 is more likely to be changed to have the characteristics more suitable for the welding.

(9) The splitter 150 that splits the oscillated laser beam L30 in two can have a simple configuration.

Modifications of Second to Sixth Embodiments

The first to the sixth embodiments can be implemented in the following modes.

In the sixth embodiment, an example is described where the oscillated laser beam L30 has the Gaussian distribution (intensity distribution D30). However, this should not be construed in a limiting sense. The intensity distribution of the oscillated laser beam may have a distribution other than the Gaussian distribution such as the top-hat distribution obtained by the oscillation by the semiconductor laser.

Figure 22:
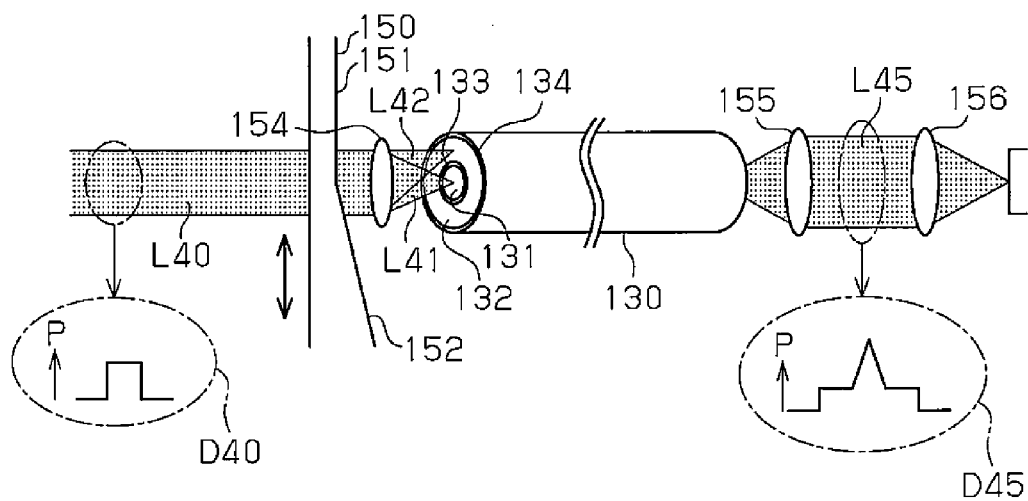
FIG. 22 is an explanatory diagram illustrating the configuration of combining laser beams in another embodiment of the laser welding device.

For example, as illustrated in FIG. 22, an oscillated laser beam L40 with a top-hat distribution (intensity distribution D40) oscillated by the semiconductor laser may be input to the intensity distribution changer 130 through the splitter 150. More specifically, first and second laser beams L41 and L42 of the oscillated laser beam L40 respectively transmit through the maintaining surface 151 to be input to the first core portion 131 through the condensing lens 154 and transmit through the refracting surface 152 to be input to the second core portion 132 through the condensing lens 154. Thus, a combined laser beam L45 with an intensity distribution D45 as a combination of the Gaussian intensity distribution obtained by the changing in the first core portion 131 and a top-hat intensity distribution obtained by the light guiding by the clad portion, is output from the output unit of the intensity distribution changer 130. The combined laser beam L45 output from the intensity distribution changer 130 is temporarily collimated into parallel light by the collimator lens 155. The parallel light thus obtained is condensed by the condensing lens 156 to be emitted onto the joining subject portion as a laser beam suitable for the welding processing.

Thus, a higher degree of freedom in design of the laser welding device can be achieved.

In the fifth embodiment, and example is described where the intensity distribution of the combined laser beam L10 is adjusted in accordance with the size and the emitted light intensity of the weld pool 350. However, this should not be construed in a limiting sense. The intensity distribution of the combined laser beam may be adjusted in accordance with any one of the size and the emitted light intensity of the weld pool. Even when the adjusting is performed in accordance with any one of the size and the emitted light intensity of the weld pool, the intensity distribution of the combined laser beam is controlled in such a manner that an appropriate size of the weld pool or an appropriate emitted light intensity of the weld pool is achieved. Thus, a higher degree of freedom in design of the laser welding device can be achieved.

In the fourth embodiment described above, an example is described where the groove width W of the groove portion 330 between the casing 310 and the lid 320 is measured by the detector 270 by using the measurement laser Se. However, this should not be construed in a limiting sense. The measurement may be performed by image recognition or with a method other than the laser measurement as long as the groove width of the groove portion can be measured. When the feedback or the like is performed, the measurement is preferably performed in a contactless manner, but may be performed with a contact type measurement device. Thus, a higher degree of freedom in design of the laser welding device can be achieved.

In the fourth embodiment, an example is described where the four detectors 270 are provided. However, this should not be construed in a limiting sense. The number of detectors may be any number from one to three or five or more as long as the groove width of the groove portion of the joining subject portion can be measured. When the number of detectors is one to three, a simple device configuration can be achieved, and when the number of detectors is five or more, the measurement can be performed with a higher accuracy or a shorter period of time. Thus, a more convenient laser welding device can be provided.

In the second to the fifth embodiments, an example is described where the oscillated laser beam L0 with the top-hat distribution is output from the laser oscillator 110. However, this should not be construed in a limiting sense. The oscillated laser beam, output from the laser oscillator, may be a distribution other than the top-hat distribution such as the Gaussian distribution, as long as the intensity distribution of the emitted laser beam can be changed by combining laser beams.

More specifically, in the second to the fifth embodiments, an example is described where the oscillated laser beam L0 with the top-hat distribution is oscillated and is partially changed to have the Gaussian distribution by the intensity distribution changer 130, and then the laser beams with the top-hat distribution and the Gaussian distribution are combined. However, this should not be construed in a limiting sense. An oscillated laser beam with the Gaussian distribution may be oscillated and partially changed to have the top-hat distribution by an intensity distribution changer, and then the laser beams with the top-hat distribution and the Gaussian distribution may be combined.

Thus, a higher degree of freedom in design of the laser welding device can be achieved.

In the second to the fifth embodiments, an example is described where the splitting ratio can be changed by changing the relative position or the relative angle of the splitter unit 122. However, this should not be construed in a limiting sense. The splitting ratio of the splitter unit 122 may set to be variable in any ways. For example, a plurality of splitter units with fixed transmittance and the reflectance may be interchangeably used. Thus, a higher degree of freedom in design of the laser welding device can be achieved.

In the second to the sixth embodiments, an example is described where the splitting ratios are set for the splitters 120 and 150. However, this should not be construed in a limiting sense. The transmittance, the reflectance, or the like may be set instead of the splitting ratio as long as the oscillated laser beam can be appropriately split. Furthermore, values such as a position, an angle, and the like corresponding to the splitting ratio, the transmittance, the reflectance, and the like may be set. Thus, a higher degree of freedom in design of the laser welding device can be achieved.

In the second to the sixth embodiments, an example is described where the intensity distribution changer 130 is a fiber laser resonator. However, this should not be construed in a limiting sense. The intensity distribution changer may not include the fiber laser resonator (optical fiber) as long as the intensity distribution of the laser beam can be changed.

Thus, a higher degree of freedom in design of the laser welding device can be achieved.

In the second to the sixth embodiments, an example is described where the battery 300 is welded. However, this should not be construed in a limiting sense. The welding subject may be any object that requires the welding processing other than the battery. Thus, a wider applicable range of the laser welding device can be achieved.

In the second to the sixth embodiments, an example is described where the joining subject is a metallic member. The joining subject member may be a member made of a material other than metal such as, for example, resin as long as the member can be molten by a laser. Thus, a higher degree of freedom in design of the laser welding device can be achieved.

Each of the first to the sixth embodiments described above is an example, and a person skilled in the art can partially delete a configuration of the embodiments, replace a configuration in one embodiment with a configuration in another embodiment, or add the configuration to a configuration of another embodiment to implement a desired combination. A subject matter of the present invention may include characteristics less than all the characteristics in a particular embodiment.

The invention claimed is:

1. A laser welding device that laser-welds a lid to an open portion of a casing, the laser welding device comprising:
   a laser emitting device that emits a laser beam to a joining subject portion including an inner side surface of the casing that defines the open portion and a peripheral surface of the lid that faces the inner side surface of the casing, wherein the inner side surface of the casing and the peripheral surface of the lid are arranged to form a groove portion in between, the inner side surface of the casing and the peripheral surface of the lid include inclined surfaces that are slidable on each other and function as a sliding portion, and the groove portion has a groove width that is variable by sliding the sliding portion;
   a detection unit that detects the groove width of the groove portion;
   an adjustment force application unit that applies force for adjusting the groove width of the groove portion with the sliding portion to at least one of the casing and the lid; and
   a control unit that controls the force applied by the adjustment force application unit in accordance with the groove width detected by the detection unit.

2. The laser welding device according to claim 1, wherein the emitted laser beam has a top-hat intensity distribution.

3. The laser welding device according to claim 1, wherein the emitted laser beam has a Gaussian intensity distribution.

4. The laser welding device according to claim 1, wherein the inner side surface of the casing and the peripheral surface of the lid that define the groove portion includes an end portion that protrudes in a direction the laser beam is emitted.

5. The laser welding device according to claim 1, wherein the adjustment force application unit includes a cooler.

6. The laser welding device according to claim 1, wherein the laser emitting device includes:
   a laser oscillator;
   a splitter that splits the laser beam output from the laser oscillator into a plurality of laser beams in accordance with a variable splitting ratio;
   a splitting ratio control unit that controls the splitting ratio of the laser beam split by the splitter;
   an intensity distribution changer that changes an intensity distribution of one of the plurality of laser beams split by the splitter; and
   a combiner that combines the laser beam of which the intensity distribution has been changed by the intensity distribution changer with another one of the plurality of laser beams split by the splitter, wherein the laser emitting device emits a combined laser beam, which is obtained by the combiner, to the joining subject portion including the groove portion.

7. The laser welding device according to claim 6, wherein the splitter splits the laser beam output from the laser oscillator into two laser beams.

8. The laser welding device according to claim 6, wherein the splitter splits the laser beam output from the laser oscillator into two laser beams.

9. The laser welding device according to claim 6, wherein
   the laser emitting device further includes a melting state measurement device that measures a melting state of the joining subject portion, and
   the splitting ratio control unit controls the splitting ratio in accordance with the melting state measured by the melting state measurement device.

10. A laser welding device comprising:
    a laser oscillator;
    a splitter that splits a laser beam output from the laser oscillator into a plurality of laser beams in accordance with a variable splitting ratio;
    a splitting ratio control unit that controls the splitting ratio of the laser beam split by the splitter;
    an intensity distribution changer that changes an intensity distribution of one of the plurality of laser beams split by the splitter; and
    a combiner that combines the laser beam of which the intensity distribution has been changed by the intensity distribution changer with another one of the plurality of laser beams split by the splitter, wherein
    the intensity distribution changer changes the intensity distribution of the one of the plurality of laser beams from a top-hat distribution to a Gaussian distribution having a distribution range that is more focused compared with that of the top-hat distribution, and
    the combiner receives a top-hat distribution laser beam and a Gaussian distribution laser beam and adds the Gaussian distribution laser beam to a center of the distribution range of the top-hat distribution laser beam.

11. A laser welding method for laser-welding a lid to an open portion of a casing, the method comprising:
    emitting a laser beam to a joining subject portion including an inner side surface of the casing that defines the open portion and a peripheral surface of the lid that faces the inner side surface of the casing, wherein the inner side surface of the casing and the peripheral surface of the lid are arranged to form a groove portion in between, the inner side surface of the casing and the peripheral surface of the lid include inclined surfaces that are slidable on each other and function as a sliding portion, and the groove portion has a groove width that is variable by sliding the sliding portion;
    detecting the groove width of the groove portion with a detection unit;
    applying force, with an adjustment force application unit, to at least one of the casing and the lid through the sliding portion to adjust the groove width of the groove portion; and controlling, with a control unit, the force applied by the adjustment force application unit in accordance with the groove width detected by the detection unit.

12. The laser welding method according to claim 11, wherein the emitting the laser beam includes:
   setting, with a splitting ratio control unit, a splitting ratio of the laser beam output from a laser oscillator;
   splitting, with a splitter, the laser beam into a plurality of laser beams in accordance with the splitting ratio;
   changing, with an intensity distribution changer, an intensity distribution of one of the plurality of laser beams split by the splitter; and
   combining, with a combiner, the laser beam of which the intensity distribution has been changed by the intensity distribution changer with another one of the plurality of laser beams split by the splitter.

13. A laser welding method for performing laser welding by emitting a laser beam to a joining subject, the method comprising:
   setting, with a splitting ratio control unit, a splitting ratio for a laser beam output from a laser oscillator;
   splitting, with a splitter, the laser beam into a plurality of laser beams in accordance with the splitting ratio;
   changing, with an intensity distribution changer, an intensity distribution of one of the plurality of laser beams split by the splitter; and
   combining, with a combiner, the laser beam of which the intensity distribution has been changed by the intensity distribution changer with another one of the plurality of laser beams split by the splitter, wherein
   the changing an intensity distribution includes
      changing the intensity distribution of the one of the plurality of laser beams from a top-hat distribution to a Gaussian distribution having a distribution range that is more focused compared with that of the top-hat distribution, and
   the combining includes
      receiving, at the combiner, a top-hat distribution laser beam and a Gaussian distribution laser beam, and
      adding, with the combiner, the Gaussian distribution laser beam to a center of the distribution range of the top-hat distribution laser beam.

14. A laser welding device comprising:
   a laser oscillator;
   a splitter that splits a laser beam output from the laser oscillator into a plurality of laser beams in accordance with a variable splitting ratio;
   a splitting ratio control unit that controls the splitting ratio of the laser beam split by the splitter;
   an intensity distribution changer that changes an intensity distribution of one of the plurality of laser beams split by the splitter;
   a combiner that combines the laser beam of which the intensity distribution has been changed by the intensity distribution changer with another one of the plurality of laser beams split by the splitter; and
   a melting state measurement device that measures a melting state of a portion irradiated with a combined laser beam generated by the combiner during welding,
   wherein the splitting ratio control unit controls the splitting ratio in accordance with the melting state measured by the melting state measurement device.

15. A laser welding method for performing laser welding by emitting a laser beam to a joining subject, the method comprising:
   setting, with a splitting ratio control unit, a splitting ratio for a laser beam output from a laser oscillator;
   splitting, with a splitter, the laser beam into a plurality of laser beams in accordance with the splitting ratio;
   changing, with an intensity distribution changer, an intensity distribution of one of the plurality of laser beams split by the splitter;
   combining, with a combiner, the laser beam of which the intensity distribution has been changed by the intensity distribution changer with another one of the plurality of laser beams split by the splitter, and
   measuring, with a melting state measurement device, a melting state of a portion irradiated with a combined laser beam generated by the combiner during welding,
   wherein the setting a splitting ratio includes controlling the splitting ratio in accordance with the melting state measured by the melting state measurement device.

* * * * *